US011562450B2

(12) United States Patent
Cook

(10) Patent No.: US 11,562,450 B2
(45) Date of Patent: *Jan. 24, 2023

(54) SYSTEMS AND METHODS FOR DATABASE MANAGEMENT OF TRANSACTION INFORMATION AND PAYMENT INSTRUCTION DATA

(71) Applicant: ZOCCAM TECHNOLOGIES, INC., Dallas, TX (US)

(72) Inventor: Ashley Cook, Dallas, TX (US)

(73) Assignee: ZOCCAM TECHNOLOGIES, INC., Dallas, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/308,984

(22) Filed: May 5, 2021

(65) Prior Publication Data

US 2021/0256641 A1   Aug. 19, 2021

Related U.S. Application Data

(63) Continuation of application No. 17/175,293, filed on Feb. 12, 2021, which is a continuation of application
(Continued)

(51) Int. Cl.
*G06Q 50/16* (2012.01)
*G06Q 20/40* (2012.01)
(Continued)

(52) U.S. Cl.
CPC ......... *G06Q 50/167* (2013.01); *G06Q 20/027* (2013.01); *G06Q 20/042* (2013.01);
(Continued)

(58) Field of Classification Search
CPC .. G06Q 50/167; G06Q 20/027; G06Q 20/042; G06Q 20/4014; G06Q 20/403
See application file for complete search history.

(56) References Cited

U.S. PATENT DOCUMENTS 7,512,564 B1   3/2009  Geer
7,978,900 B2   7/2011  Nepomniachtchi et al.
(Continued)

FOREIGN PATENT DOCUMENTS

| JP | 2008234613 A | 10/2008 | |
|---|---|---|---|
| WO | 2008057422 A1 | 5/2008 | |
| WO | WO-2014071327 A1 * | 5/2014 | ........... G06Q 20/042 |

OTHER PUBLICATIONS

Pedro Oliveira and Eric von Hippel. Users as Service Innovators: The case of Banking Services. Research Policy 40 (2011) 806-818. (Year: 2011).*

(Continued)

*Primary Examiner* — Virpi H Kanervo
(74) *Attorney, Agent, or Firm* — Procopio, Cory, Hargreaves & Savitch LLP

(57) ABSTRACT

A system for storing data related to a transaction and for facilitating the transaction, the system comprising: an application server coupled with a database and configured to store information associated with a plurality of transactions, the information including account information related to a user account maintained by a first financial institution, a recipient identifier, and account information related to a recipient account maintained with a second financial institution, the application server further configured to: receive transaction data associated with a payment of the transaction, the transaction data comprising an identifier and user account information; identify the recipient account information based on a comparison of the received identifier against the stored recipient identifier; generate transfer instructions data based on the transaction data and recipient account information; and forward the transfer instructions data to the first financial institution based on the user account information to cause a deposit into the recipient account.

16 Claims, 28 Drawing Sheets

Related U.S. Application Data

No. 15/910,914, filed on Mar. 2, 2018, now Pat. No. 10,922,767, which is a continuation-in-part of application No. 15/887,790, filed on Feb. 2, 2018, now Pat. No. 10,922,766, which is a continuation-in-part of application No. 14/703,907, filed on May 5, 2015, now Pat. No. 10,671,982.

(60) Provisional application No. 61/991,555, filed on May 11, 2014.

(51) Int. Cl.
    *G06Q 20/04*    (2012.01)
    *G06Q 20/02*    (2012.01)
    *G06Q 30/06*    (2012.01)

(52) U.S. Cl.
    CPC ....... *G06Q 20/403* (2013.01); *G06Q 20/4014* (2013.01); *G06Q 30/06* (2013.01); *G06Q 30/0601* (2013.01); *G06Q 50/16* (2013.01)

(56) References Cited

U.S. PATENT DOCUMENTS

| | | |
|---|---|---|
| 8,433,647 B1 | 4/2013 | Yarbrough |
| 8,442,906 B1 | 5/2013 | Thomas |
| 8,837,806 B1 | 9/2014 | Ethington et al. |
| 9,058,580 B1 | 6/2015 | Amtrup et al. |
| 9,626,674 B1 | 4/2017 | Wolff |
| 9,779,392 B1* | 10/2017 | Prasad .................. G06Q 20/10 |
| 10,002,398 B1 | 6/2018 | Isaacson |
| 10,410,302 B1 | 9/2019 | Siegler |
| 10,692,066 B1* | 6/2020 | Brown ................. G06Q 20/108 |
| 2002/0145035 A1 | 10/2002 | Jones |
| 2002/0178122 A1 | 11/2002 | Maes |
| 2003/0187756 A1 | 10/2003 | Klivington et al. |
| 2004/0030631 A1 | 2/2004 | Brown et al. |
| 2004/0143450 A1 | 7/2004 | Vidali |
| 2005/0071283 A1 | 3/2005 | Randle et al. |
| 2005/0288955 A1 | 12/2005 | Lewiss-Hachmeister |
| 2007/0094510 A1 | 4/2007 | Ross et al. |
| 2007/0194102 A1 | 8/2007 | Cohen et al. |
| 2007/0219818 A1* | 9/2007 | Duthler .................. G06Q 10/10 705/45 |
| 2008/0086420 A1 | 4/2008 | Gilder et al. |
| 2009/0088088 A1 | 4/2009 | Caswell |
| 2009/0234764 A1 | 9/2009 | Friesen |
| 2009/0240550 A1 | 9/2009 | McCarty |
| 2010/0161466 A1 | 6/2010 | Gilder |
| 2012/0078789 A1 | 3/2012 | Harrell |
| 2012/0109814 A1 | 5/2012 | Salzmann et al. |
| 2013/0080385 A1 | 3/2013 | Ho et al. |
| 2013/0155474 A1 | 6/2013 | Roach et al. |
| 2013/0339189 A1 | 12/2013 | Minerick |
| 2014/0112571 A1 | 4/2014 | Viera et al. |
| 2014/0136393 A1 | 5/2014 | Nishimaki |
| 2014/0188715 A1 | 7/2014 | Barlok et al. |
| 2014/0244484 A1 | 8/2014 | Boss et al. |
| 2014/0244485 A1 | 8/2014 | Keenan et al. |
| 2014/0279488 A1 | 9/2014 | Drake et al. |
| 2014/0375422 A1 | 12/2014 | Huber et al. |
| 2015/0032605 A1 | 1/2015 | Williams et al. |
| 2015/0161587 A1 | 6/2015 | Khan et al. |
| 2015/0332418 A1 | 11/2015 | Wilson et al. |
| 2016/0098578 A1 | 4/2016 | Hincker |
| 2016/0180478 A1 | 6/2016 | Cunningham |
| 2016/0275476 A1 | 9/2016 | Artman et al. |
| 2017/0093851 A1 | 3/2017 | Allen |

OTHER PUBLICATIONS

Office Action dated Oct. 1, 2020 in related U.S. Appl. No. 15/933,238, in 18 pages.

Office Action dated Sep. 24, 2020 in related U.S. Appl. No. 15/887,790, in 19 pages.

Office Action dated Sep. 29, 2020 in related U.S. Appl. No. 15/933,232, in 15 pages.

Office Action dated Sep. 30, 2020 in related U.S. Appl. No. 15/933,247, in 17 pages.

Steven D. Levitt and Chad Syverson. Market Distortions when Agents are Better Informed: The Value of Information in Real Estate Transactions. The Review of Economics and Statistics. vol. XC. No. 4. Nov. 2008. (22 pages).

Office Action dated Mar. 16, 2022 in related U.S. Appl. No. 17/174,113, in 25 pages.

Office Action dated Mar. 31, 2022 in related U.S. Appl. No. 17/175,293, in 18 pages.

Office Action dated Sep. 9, 2022 in related U.S. Appl. No. 17/174,113, in 19 pages.

\* cited by examiner

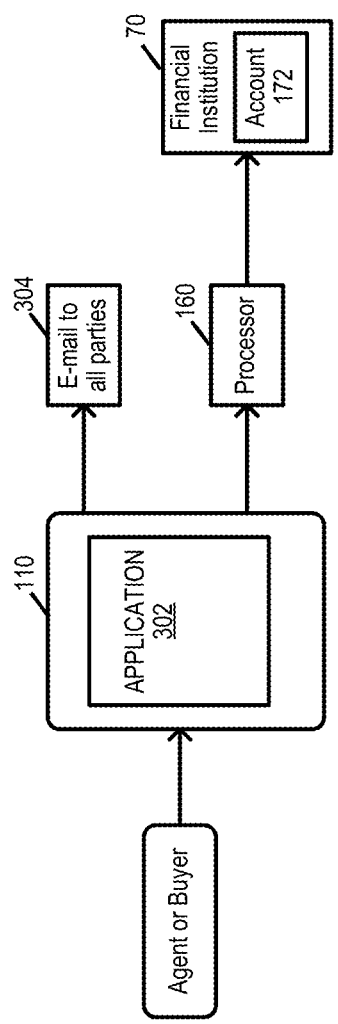

| User Types | Money Transfers | Earnest Money | ACH | Chat | Docs |
|---|---|---|---|---|---|
| Buyer | Earnest Money | Upload Contract | Option Fee [Texas] | Secure In-App Communication | IF BUYER: Property, Seller, Realtor, Builder, Title Co |
| Seller | Additional Earnest Money | Gather contract information: Property Address, Buyer, Seller, Realtors, Title Company | Appraisal | Title Company, Lender, Broker, Seller, Realtor, Buyer, Builder | IF REALTOR: Property, Seller, Buyer, Other Realtor, Title Co |
| Realtors | Option Fee [ACH] | Capture Check | Survey | | IF SELLER: Property, Buyer, Realtor, Title Co |
| Borrower | Appraisal Payment [ACH] | Create X9 file for Bank | Loan Application Fee | | IF LENDER: Buyer, Title Co |
| Notary | Closing Costs | RamQuest SoftPro | | | IF BUILDER: Buyer, Lender, Title Co |
| Escrow Agent | Realtor Commissions | Notifications | | | |
| Lender | Vendor Payments | | | | |
| Builder | Seller Proceeds | | | | |
| Title Company | | | | | |

| Contact Manager | Authenticate |
|---|---|
| User Database | DL/Passport Capture |
| Push Sales Materials Via App or Text | Fraud Protection |
| Portal to Have Visibility of Transactions | Geo Location |
| | Selfie ID |

Product Offerings

FIG. 11

SYSTEMS AND METHODS FOR DATABASE MANAGEMENT OF TRANSACTION INFORMATION AND PAYMENT INSTRUCTION DATA

RELATED APPLICATIONS INFORMATION

This application is a continuation of U.S. patent application Ser. No. 17/175,293, entitled "SYSTEMS AND METHODS FOR DATABASE MANAGEMENT OF TRANSACTION INFORMATION AND PAYMENT INSTRUCTION DATA," filed on Feb. 12, 2021, which in turn is a continuation of U.S. patent application Ser. No. 15/910,914, entitled "SYSTEMS AND METHODS FOR DATABASE MANAGEMENT OF TRANSACTION INFORMATION AND PAYMENT INSTRUCTION DATA," filed on Mar. 2, 2018, which in turn claims priority as a Continuation-in-Part patent application under 35 U.S.C. § 120 to U.S. patent application Ser. No. 15/887,790, entitled "SYSTEMS AND METHODS FOR DATABASE MANAGEMENT OF TRANSACTION INFORMATION AND PAYMENT DATA," filed on Feb. 2, 2018, which in turn claims priority as a Continuation-in-Part patent application under 35 U.S.C. § 120 to U.S. patent application Ser. No. 14/703,907, entitled "PAYMENT PROCESSING SYSTEM, APPARATUS AND METHOD IN REAL ESTATE TRANSACTIONS," filed on May 5, 2015, which in turn claims priority to Provisional Patent Application 61/991,555, filed on May 11, 2014 with the same title, both of which are incorporated herein by reference as if set forth in full.

BACKGROUND

1. Technical Field

The embodiments described herein are related to relation management as well as document management and payment management and verification, in particular with respect to real-estate or other transactions that require payment handling and verification.

2. Related Art

In certain types of transactions, e.g., real-estate transactions require that certain payments be made and verified at certain points in time. Failure to do so can put certain aspects of the transaction or the entire transaction in jeopardy. For example, in a residential real-estate transaction, the buyer must provide an earnest money payment in to confirm the executed Real Estate Purchase and Sale Contract. The contract is not enforced until the payment is confirmed.

Typically, the, e.g., earnest money payment is made to the title insurance company associated with the transaction or to a separate escrow company. Usually, the buyer must give a check to the buyer's agent, who must hand deliver, or deliver via Fedex or some other carrier, the check to the seller's agent, who passes it to the seller, who must then deposit the check.

Moreover, other payments or distributions of funds, whether prior to closing, at closing, or post-closing, can require checks to be received or sent by the title company, which means an employee of the title company is then tasked with making sure that all the checks received are associated with and credited to the correct accounts, or sent to the proper parties. But sometimes the checks or payments are lost, or associated with the wrong account, or can be subject fraud.

Wiring funds is also subject to problems because of the risk of unlawful access to e-mails from title company representative to the Buyer and/or the Buyer Agent containing wiring instructions for wiring of cash amounts.

Accordingly, the process for receiving an verifying such payments or distributions is often a time consuming, manual process that is still subject to mistakes or fraud.

In general, real-estate transactions often involve multiple payments to parties to the transaction, their agents as well as third parties and include earnest money, option money (optionally), Buyer's Cash Due at Closing (amount due communicated to Buyer and Buyer Agent via Title Company Representative), real property appraisal, real property inspection, Homeowners Association Resale Certificate, repair on real property made by Seller, commissions due to buyer agent, buyer broker, seller agent and seller broker. Known methods for handling the payments concomitant to real estate purchase and sale transactions and closing of such transactions, which include forwarding/handling of paper checks and e-mailing of wire instructions, are prone to human error, transaction fees, delay and even fraud. The known risks in handling of payments include inefficiencies in handling of paper checks and inefficiencies in communications among parties to the transaction, their brokers and the title company.

Attempts to convert to electronic systems that allow participants to send and receive funds electronically also have problems that include security and the ability to verify the identity of a participant.

SUMMARY

Systems and methods for database management of transaction and facilitating the transaction based in part on payment instruction data are disclosed herein.

According to one aspect, a system for storing data related to a transaction and for facilitating the transaction, the system comprises a database; an application server coupled with the database and configured to store information associated with a plurality of transactions, the information including user account information related to a user account for the user maintained by a first financial institution, a recipient identifier, and recipient account information related to a recipient account for the recipient maintained with a second financial institution, the application server further configured to: receive transaction data associated with a payment related to the transaction from a device, the transaction data comprising an identifier of the recipient and the user account information; identify the recipient account information related to the transaction based on a comparison the received identifier of the recipient against the stored recipient identifier; generate transfer instructions data based on the received transaction data and identified recipient account information; and forward the transfer instructions data to the first financial institution based on the received user account information to cause a deposit into the recipient account.

These and other features, aspects, and embodiments are described below in the section entitled "Detailed Description."

BRIEF DESCRIPTION OF THE DRAWINGS

Features, aspects, and embodiments are described in conjunction with the attached drawings, in which:

FIGS. 2a-j are screen shots illustrating an example process for facilitating an earnest money payment using the system of FIG. 1;

FIG. 3 is a diagram illustrating how the system of FIG. 1 can carry out the process illustrated by the screen shots of FIGS. 2a-j in accordance with one example embodiment;

FIG. 11 is a diagram further illustrating the application server of FIG. 5;

DETAILED DESCRIPTION

Certain embodiments of a transaction management system that allows various parties to communicate with each other, provide documentation and other information, as well as transmit and verify payment in a secure fashion are disclosed herein. It will be understood that while various steps, components, parties, etc., are disclosed in the description of the embodiments below, the embodiments are by way of example and should not be seen as limiting the systems and methods described to only those steps, components, parties, etc., disclosed.

Figure 1:
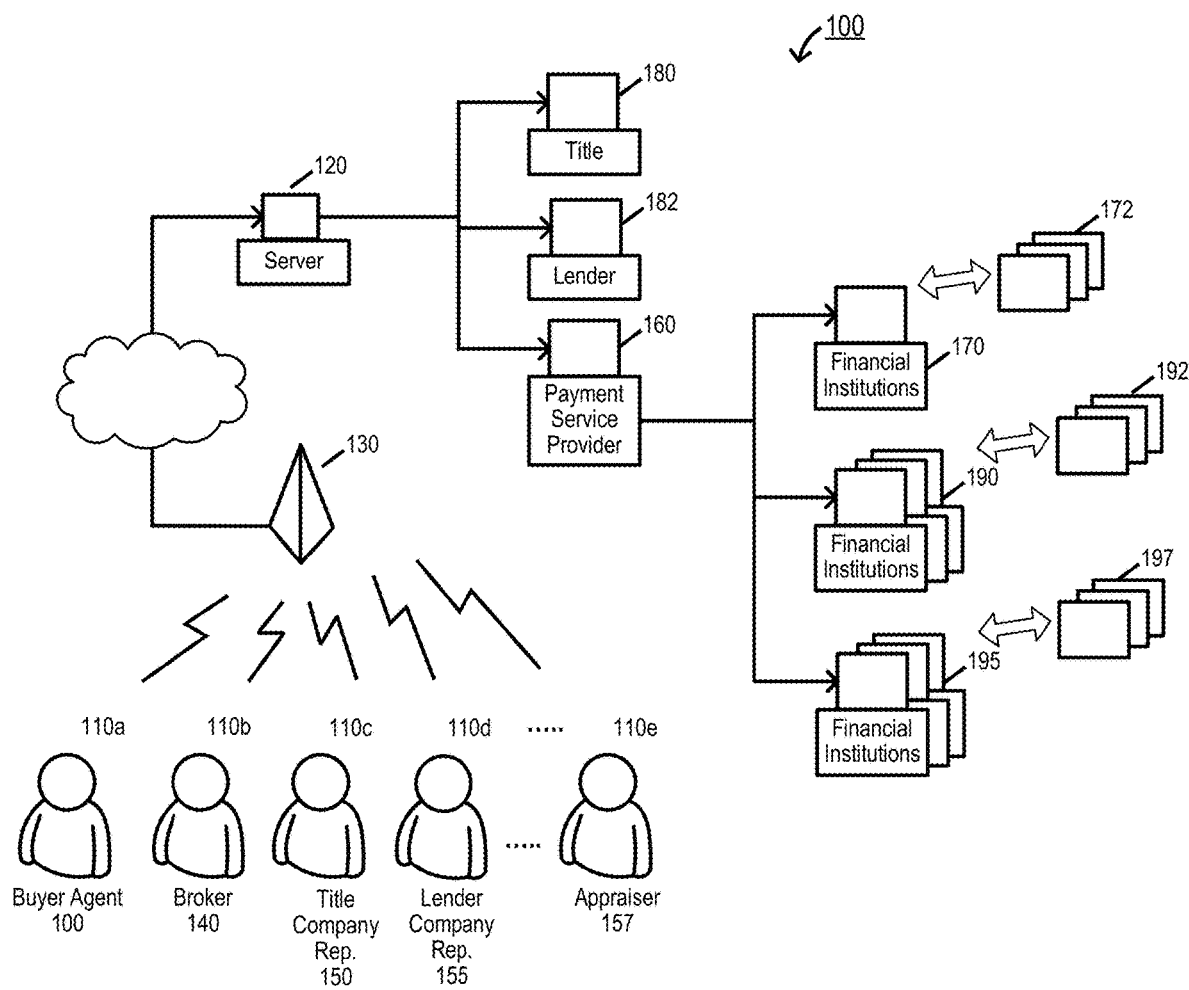
FIG. 1 is a diagram illustrating an example transaction processing system configured in accordance with one example embodiment.

FIG. 1 is a diagram illustrating an example transaction processing system 100 configured in accordance with one example embodiment. At the core of system 100 is application server 120. Application server can be configured to manage the transaction as described herein. Application server 120 can also be configured to download a mobile application to devices 110 of various participants in the transaction. Alternatively, the mobile application can be downloaded from an online app-store. Information, documents, checks, etc., can then be captured using devices 110 and the mobile application downloaded thereon. The information, documents, checks, etc., can then be processed, verified, etc., on server 120 and then various information, notices, etc., can be forwarded to various participants or entities as described below.

The various participants can include the buyer agent 100, seller agent 140, title company representative 150, lender company representative 155, possibly an escrow agent, and various other third parties 157 such as the appraiser, inspection agent, handyman or repair man, etc. Each of these participants can access server 120 via a device 110, such as a smartphone, tablet, laptop or other computer, etc.

Server 120 can also be interfaced on the back-end with the various institutions systems involved with the transactions. Often these institutions are associated with the various participants described above. For example, server 120 can be interfaced with the title company 180 (and escrow company (not shown) if a separate escrow company is used) and lender 182 as well as the financial intuitions associated therewith. Thus, for example, server 120 can be interfaced with the financial institution 170 associated with the title company 180 and the financial institution(s) 190 associated with the various accounts 192 of third parties. In certain embodiments, depending on what payment options are available server 120 can also interface with payment service providers 160 associated with the various payment options and/or institutions. Alternatively, server 120 can act as the payment processor. In some embodiments, alone or in combination, server 120 can be interfaced with the financial institution 195 associated with the users (e.g., buyers, sellers, agents, etc.) of the system and the financial institution(s) 195 associated with accounts 197 of the users.

At a high level, each participant can download and register with the mobile application. During registration, each participant can create a credential that can be used to authenticate the participant's interactions with the mobile application. Once registered, the transaction can be set up within the system 100. For example, the property number can be used to create a "file" within the system. In addition, certain information related to each of the participants can be associated with the file as well as any institution specific information, such as the lender's file number, title company's file number, etc.

Third party vendors can also sign up and provide the information needed provide verification of task performance and receive payments as a Vendor, such as an inspector, attorney or realtor.

Once the file is set up, the application can be used to exchange information, notices, documentation, payment, etc. In particular, the system can be used to make and verify payments such as the earnest money payment. While the systems and methods described herein can facilitate payments via credit card or through service such as Venmo or PayPal, payment via mobile deposit of a Check 21 image or ACH can also be supported. Peer-to-peer payment can also be facilitated as described in more detail below.

Figure 2A:
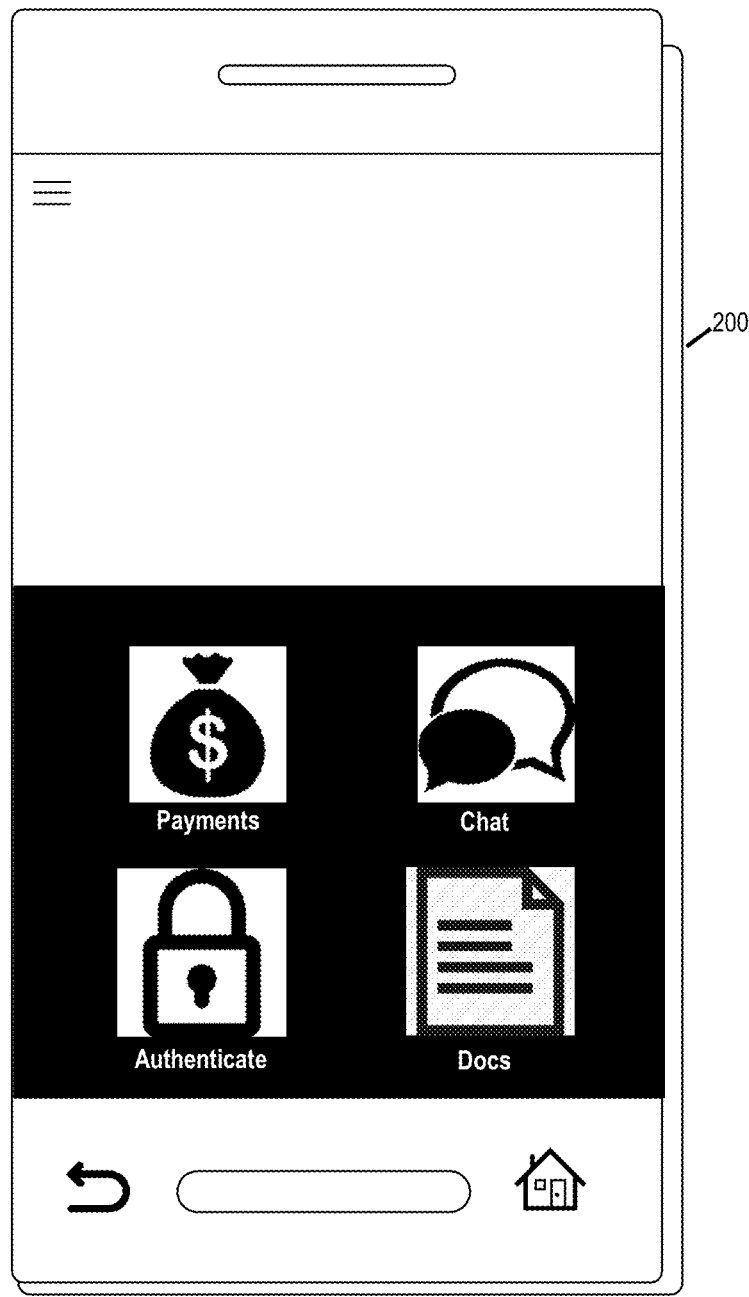
Figure 2B:
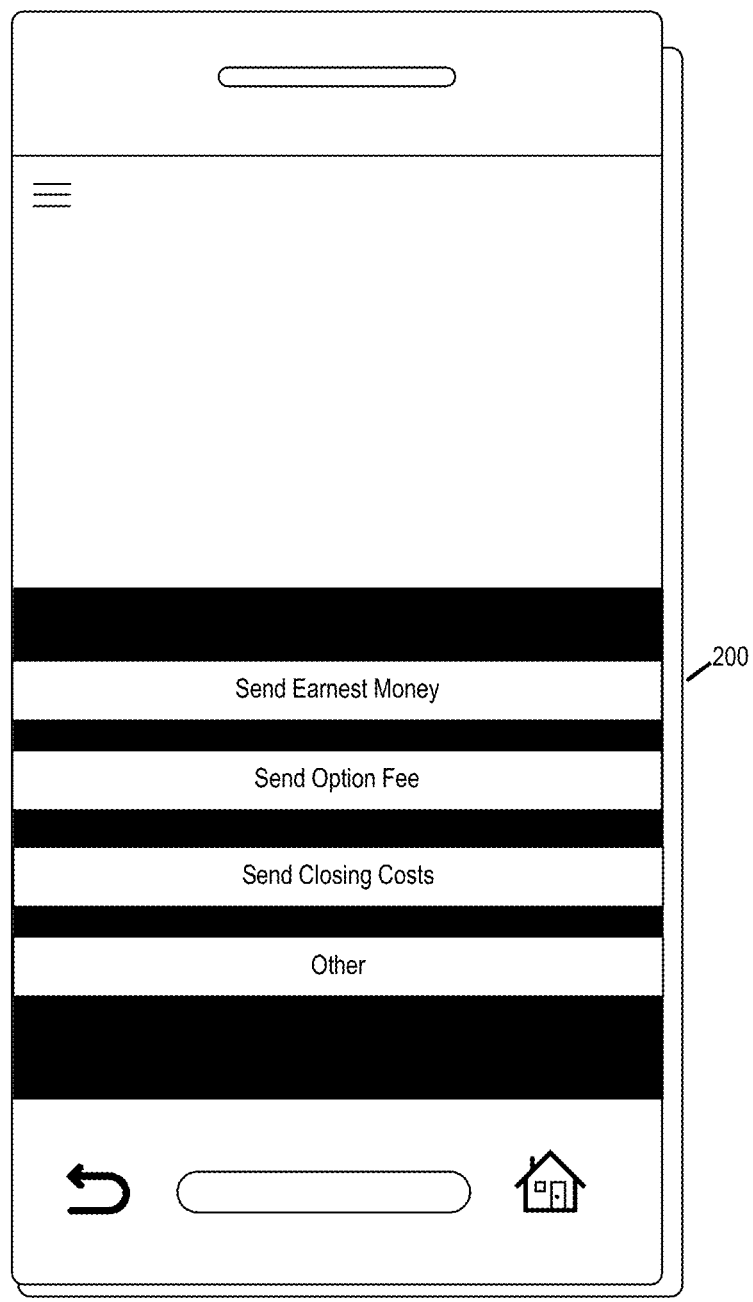
Figure 2C:
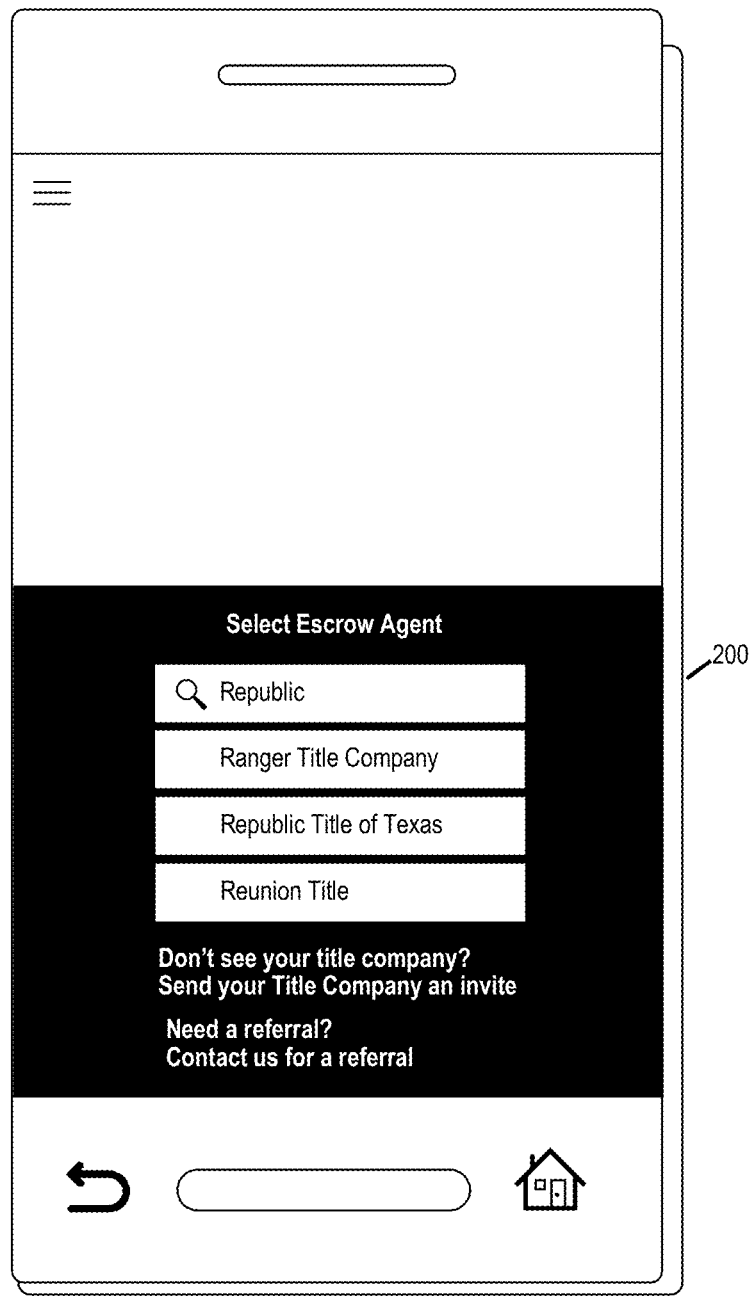

Both mobile deposit and ACH require physical check processing via the mobile application. For example, the process for facilitating an earnest money payment is illustrated with the aid of the screen shots of FIGS. 2a-j and the block diagram of FIG. 3. As can be seen in FIG. 2b, the buyer's agent can select a payment in the application user interface 200. The agent can then select "send earnest money" through the User Interface (UI) 200 of the buyer's agent 110. As illustrated in FIG. 2c, the buyer's agent can then select an escrow/title company, via UI 200. For example, the application can be set up to use geolocation capabilities to poll the escrow agents within a defined radius with respect to the mobile user.

Figure 2D:
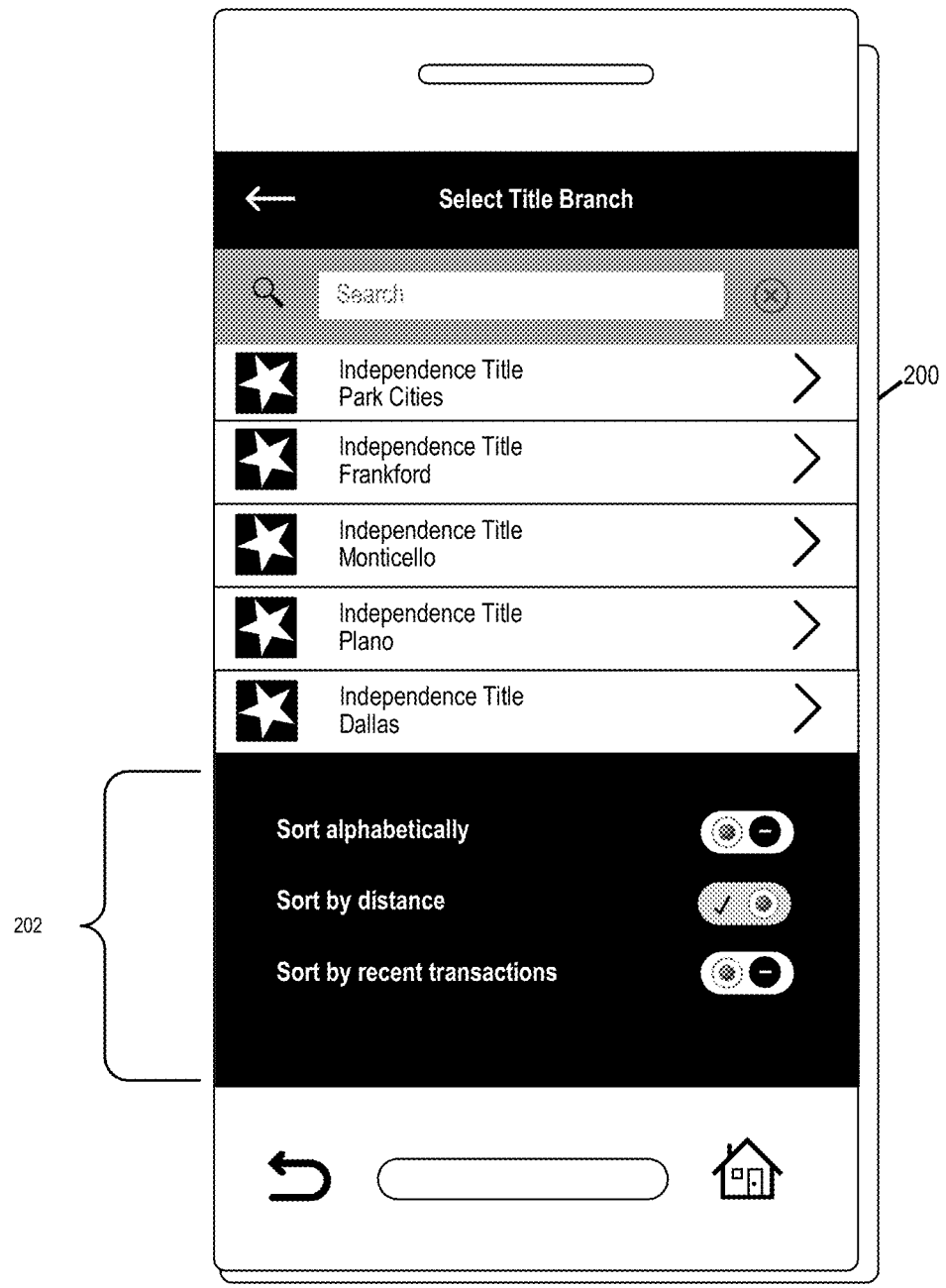
Figure 2E:
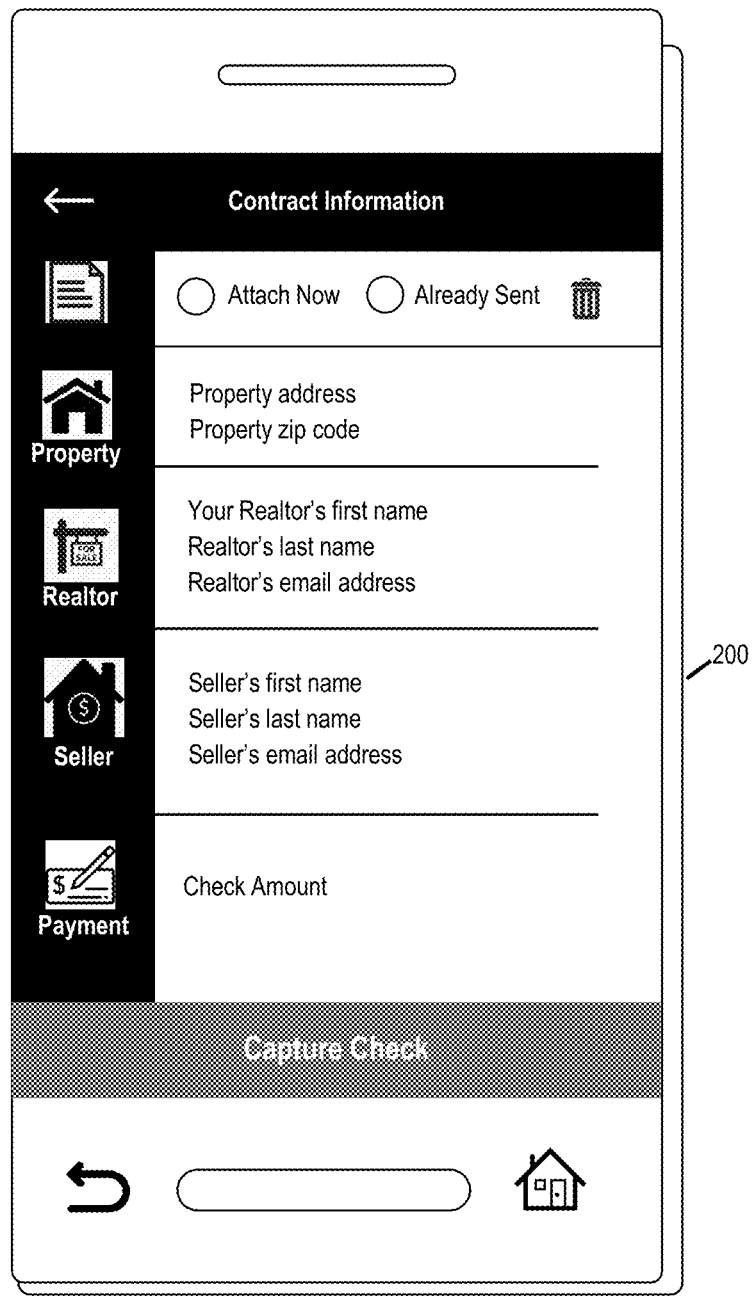

In certain embodiments, the agent can then select the branch office as illustrated in FIG. 2d. The application can be configured to present options 202 for sorting the branches. As illustrated in FIG. 2e, the buyer's agent can then be presented with a screen via UI 200 that allows the agent to upload the contract, which may already been scanned or otherwise saved in digital form, other information related to the property, realtor, seller and the payment can also be provided.

Figure 2F:
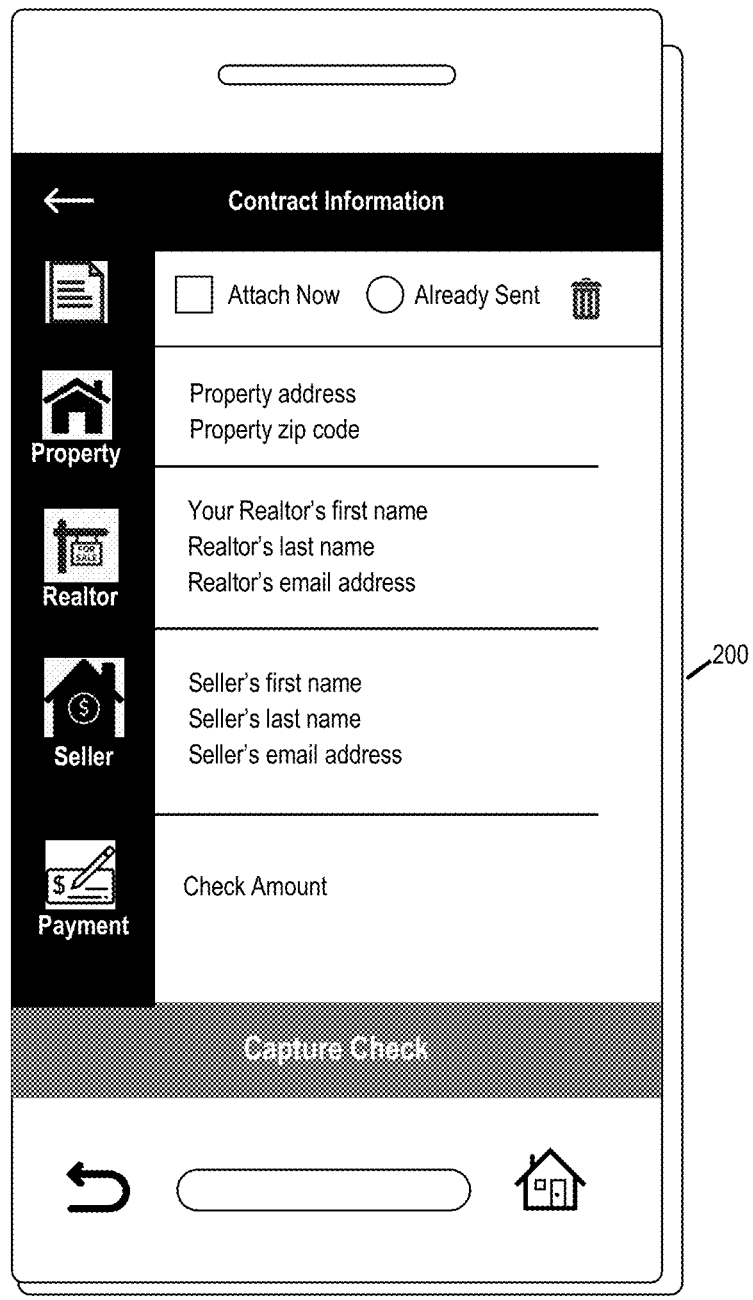
Figure 2G:
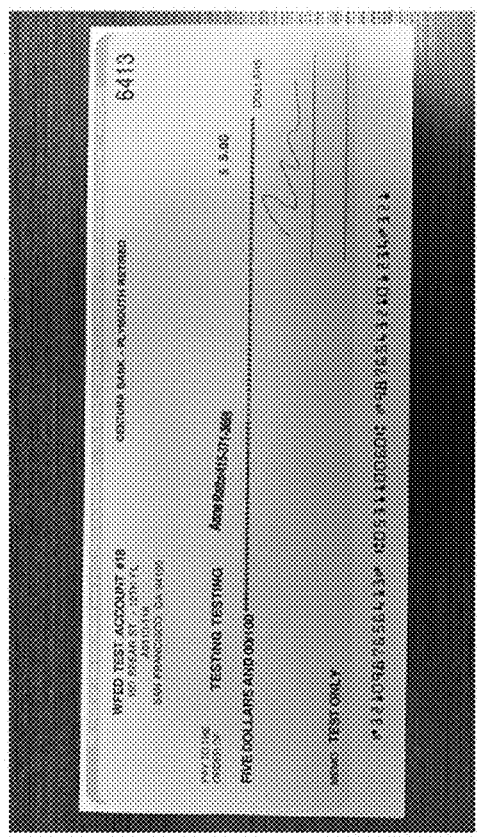
Figure 2H:
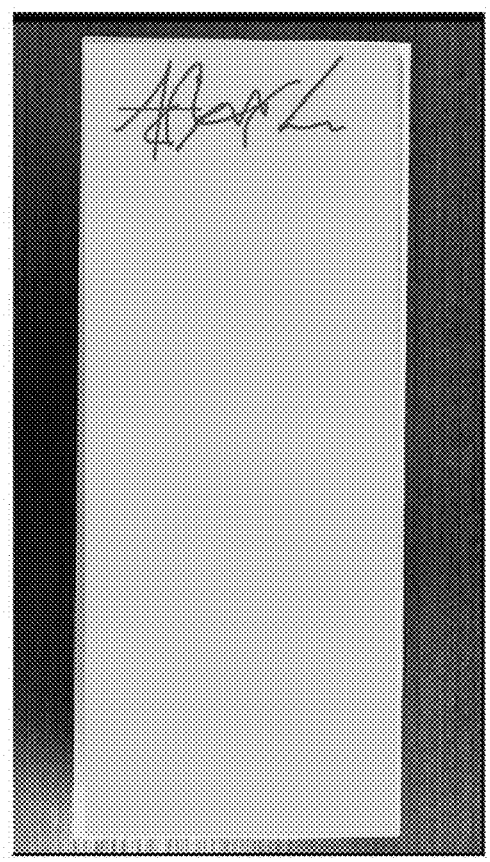
Figure 21:
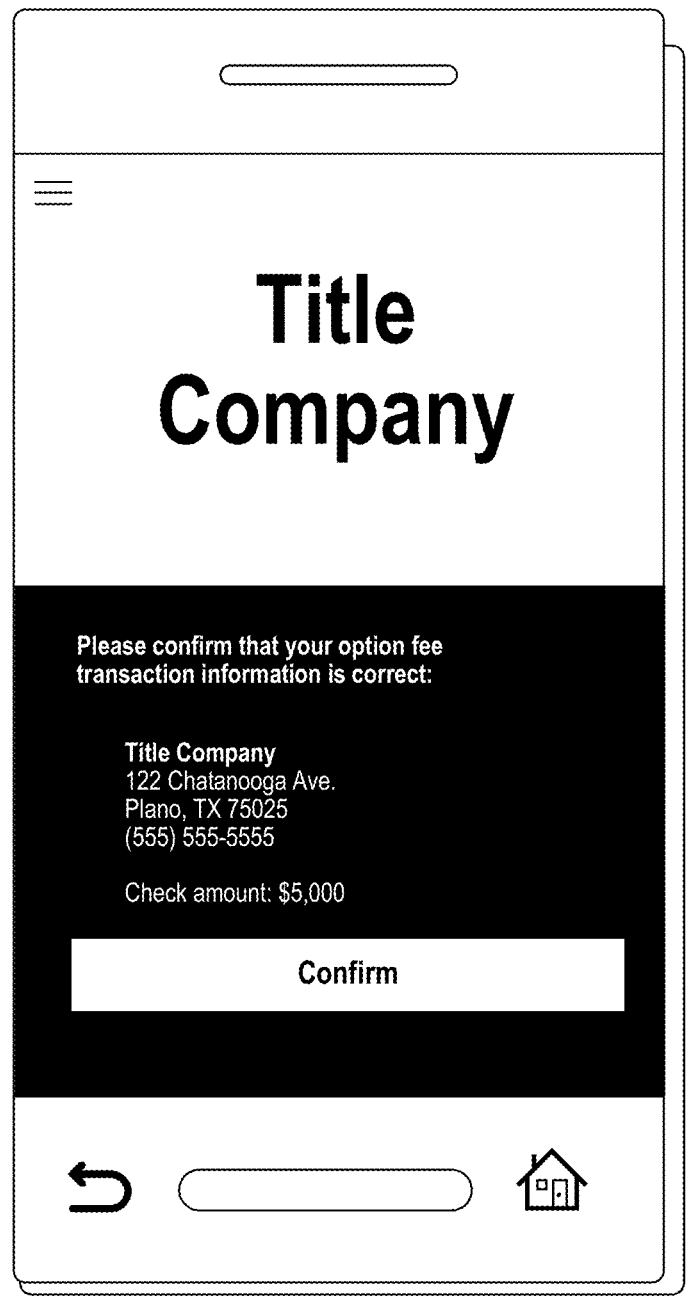

As can be seen in FIG. 2f, the mobile application 302 can then prompt the buyer's agent to capture an image of the front of the check and possibly the back as well. FIGS. 2g and 2h illustrate the capturing of the front and back of the check. It should also be noted that this capture can also be performed by the Title Company at closing, or by a notary as described below for a remote closing.

As illustrated in FIG. 3, the mobile application 302 on the buyer's agent's device 110 can then cause a check 21 compliant image of the check to be provided to the financial institution 170 associated with the escrow/title company 180 for deposit into the appropriate escrow account 172. If mobile deposit is not available, the application 302 can obtain the MICR information from the check information and use it to perform an ACH transaction. As noted above, a payment processor 160 can facilitate the transaction.

Figure 2J:
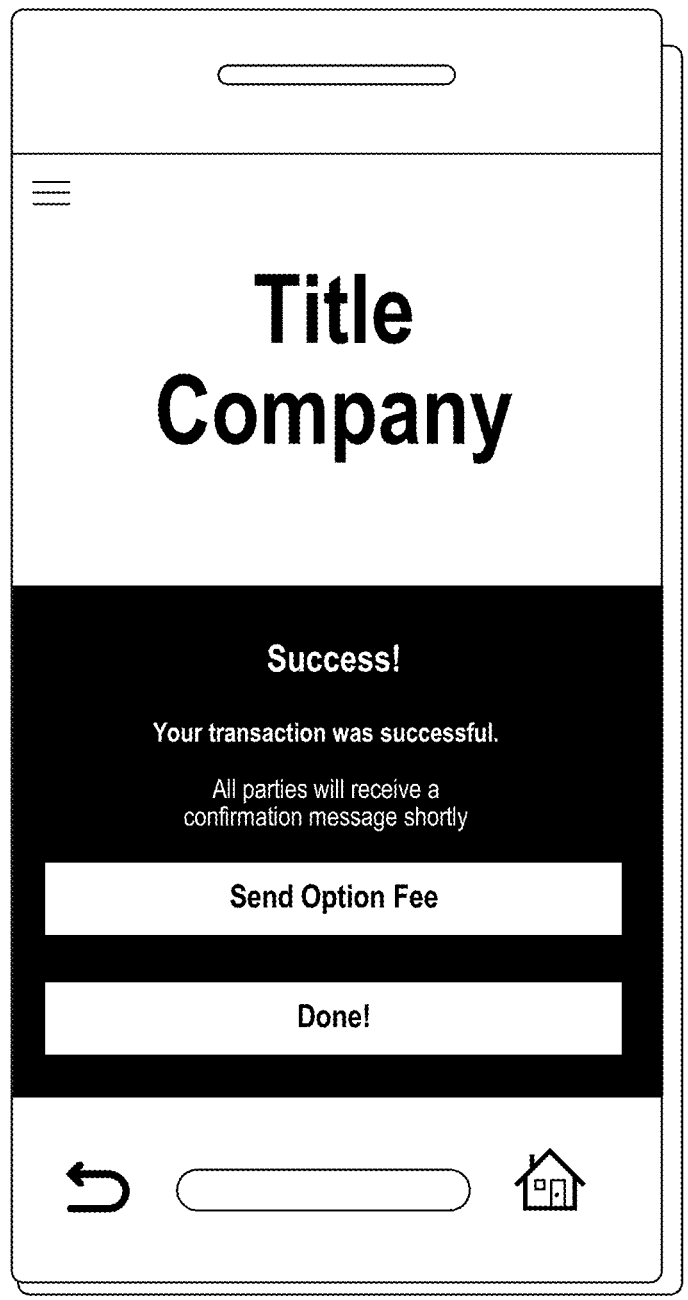

The agent can then receive a confirmation as illustrated in FIG. 2i and an indication that all parties will be notified as illustrated in FIG. 2j. As can also be seen in FIG. 3, e.g., email notifications 304 can automatically be sent to all or selected transaction participants.

Thus, the application 302 or application server 120 can cause a notification to be sent to the escrow/title company 170 associated with the escrow account 172. The notification can include: the name of the real estate agent who initiated the transaction; the agent's contact information; the property address associated with the transaction; the payment amount, the name of the seller; the name of the buyer; the name of the escrow and/or title company; and the date and time of the delivery of the check.

Optionally, the notification can include a check image. In addition, or alternatively, the notification includes a link that can be used to access an image of the check through application 302/server 120. The receipt notification can be printed along with the check image and placed in a physical file. Alternatively, a virtual file can be maintained on server 120 and accessed through application 302 or via a portal to server 120.

In so-called 'broker escrow states,' the Broker Escrow Account (as opposed to the Title Company Escrow Account) is designated for receiving escrow payments per the disclosed system. When the real estate sale and purchase contract is executed in the broker escrow states, the disclosed system allows for independent title companies to be involved in the transaction as follows: (1) The independent Title Company Representative receives the Real Estate Sale and Purchase Contract that the Buyer or Buyer Agent uploads via the disclosed application and (2) Remote deposit capture of the Buyer's escrow payment is processed per the described method and is deposited in the Broker Escrow Account and the Application Server automatically sends an e-mail confirmation of that payment to the independent Title Company Representative.

Figure 4:
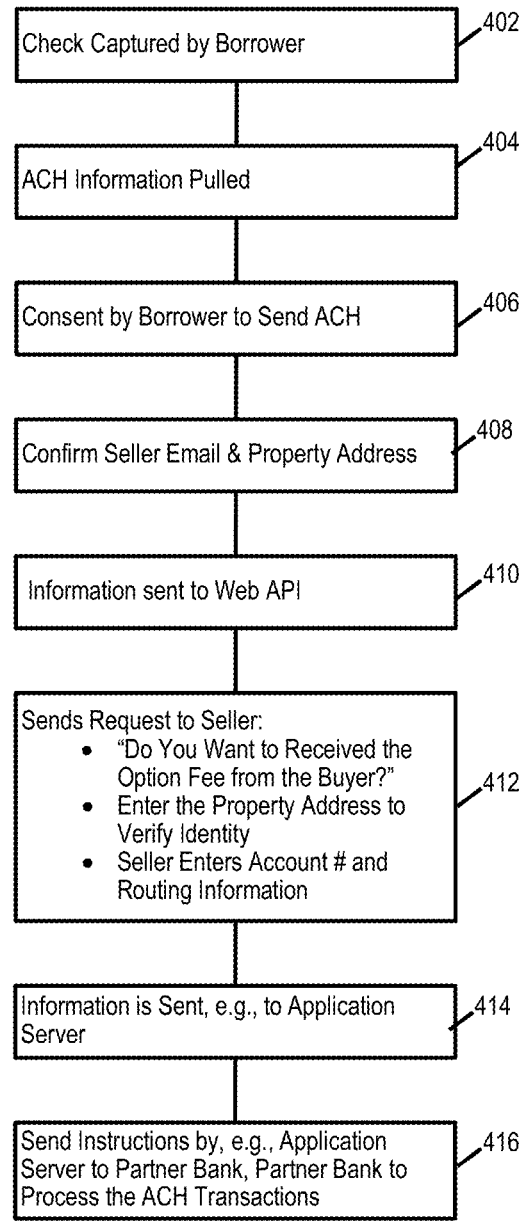
FIG. 4 is a flow chart illustrating an example process for processing option checks within the system of FIG. 1.

The process for processing option checks can be slightly different and is illustrated in the flow chart of FIG. 4. In this case, the check image can be captured by the buyer in step 402 and ACH information can be pulled from the check image in step 404. In step 406, consent to send the ACH transaction information can be obtained from the borrower, i.e., buyer, via the buyer's application 302. In step 408, the seller email and the property address can be confirmed and the information sent to server 120 in step 410.

In step 412, server 120 can then communicate with the seller to confirm that the seller is willing to receive the option payment. If so, then in step 414, the seller can be requested to provide the property address to verify the seller identity. The seller can then provide the seller's account and routing information.

In step 416, server 120 can route the instructions and information to the appropriate financial institution 170 in order to complete the ACH transaction. In this case, the Seller provides and electronic endorsement that is payable to the operator of server 120, or can elect the operator to serve as the agent of Seller to receive the funds.

A few things to note about the payment transaction described with respect to FIGS. 2a-j and 3. First, as noted in more detail below, the transaction information does not need to be stored anywhere in the system. Thus, wiring instructions are not emailed "in the open" inviting interception by fraudsters (e.g., as described below in connection to FIGS. 12a-e and 13). And obviously, the physical check does not need to go through several handoffs.

Second, the system can be configured to allow the identity of the participants to be authenticated. As noted above, each participant can be required to create a credential during registration that can be used or authentication. For example, when a participant is registering, they can create a PIN, or register a biometric, such as finger print, voice, or face, or some combination thereof as the credential to be used for authentication. Thus, when the check is transmitted, the, e.g., buyer's agent can be required to authenticate themselves using their credential.

This can be important, because as noted above, the buyer's agent is not depositing the check into their own account, rather they are depositing the check into the escrow account associated with the transaction. Accordingly, extra authentication may be required.

Figure 5:
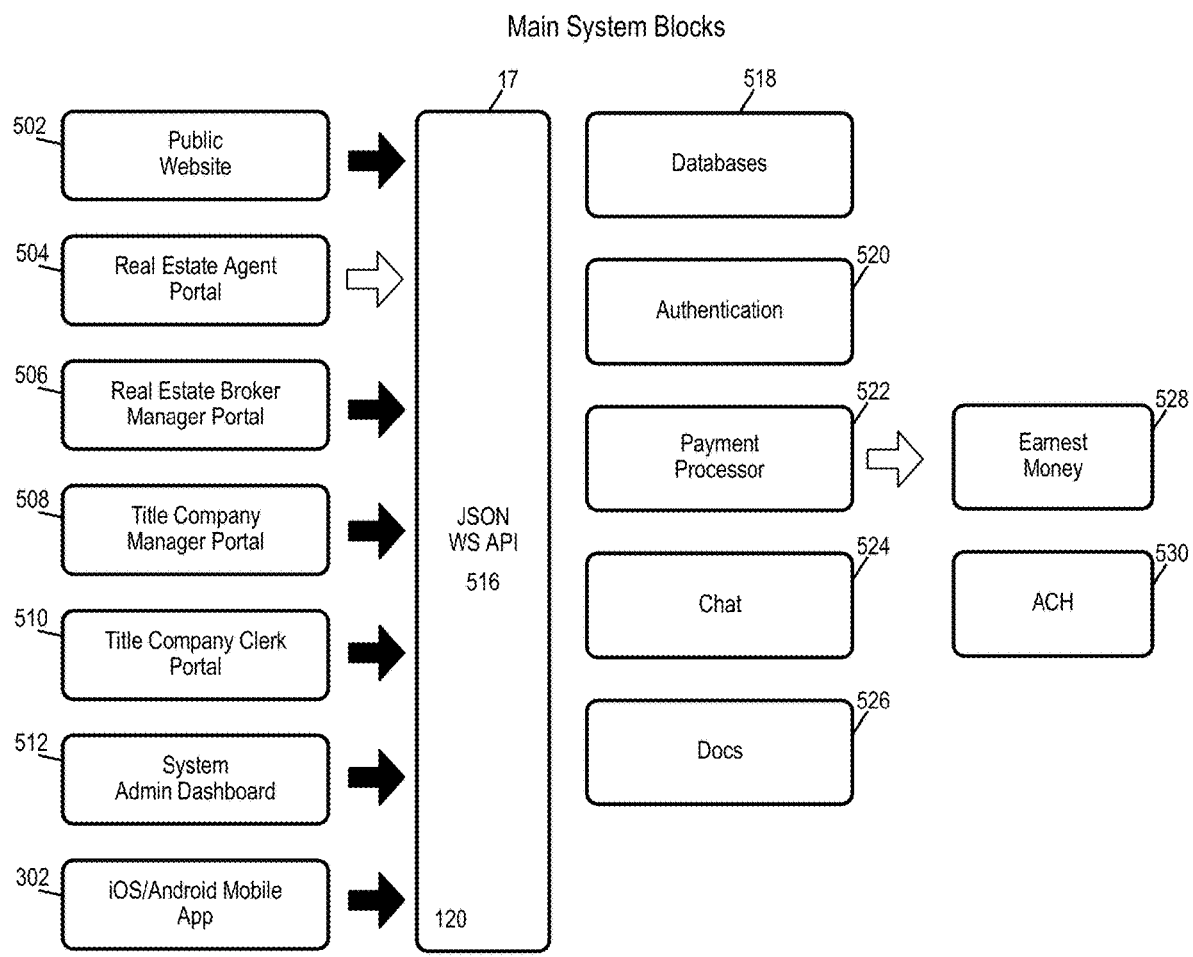
FIG. 5 is a block diagram illustrating certain components of an application processor included in the system of FIG. 1 in accordance with one embodiment.

FIG. 5 is a block diagram illustrating certain components of system 100. As can be seen, the system can comprise a number of application/portals 504-512 configured to interface with a number of resources 518-522 via one or more API's 516. The applications/portals can comprise an agent portal 504 as well as a broker portal 506; title company manager portal 508 as well as a title company clerk portal 510; and an administer portal 512. In addition, the resources 518-522 can be accessed through the application 302 and possibly via a website 502 associated with server 120.

The resources can include a database for storing and accessing documents, information, notifications, check images, etc., associated with the sales transaction being handled in the system; an authentication module 520 for handling the authentication described above; and payment processing module for, e.g., interfacing with payment processor 160.

It should be noted that depending on the embodiment, some or all of the portal functionality, API's, and even some of the resources, such as the authentication and payment processing modules 520 and 522, respectively, can be integrated into mobile application 302.

Figure 6A:
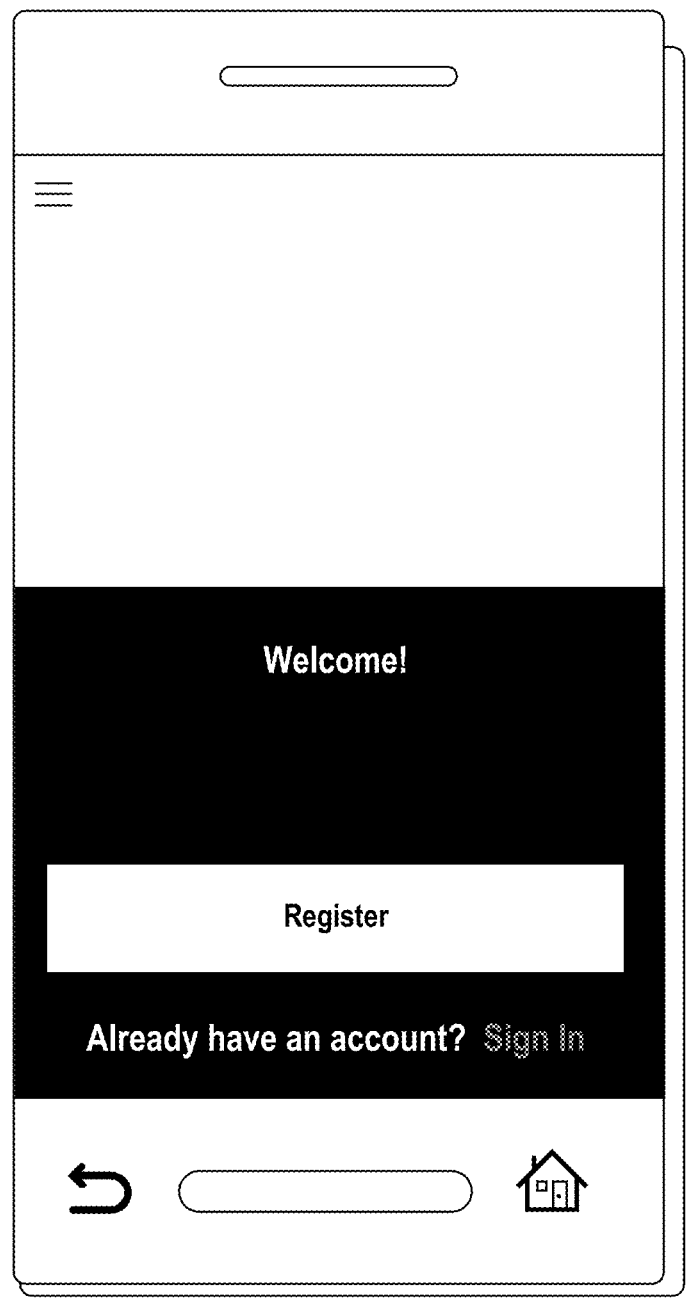
FIGS. 6a-f are screen shots illustrating an example process for downloading an application, registering a user and establish the relevant credentials to be used for authentication within the system of FIG. 1.
Figure 6B:
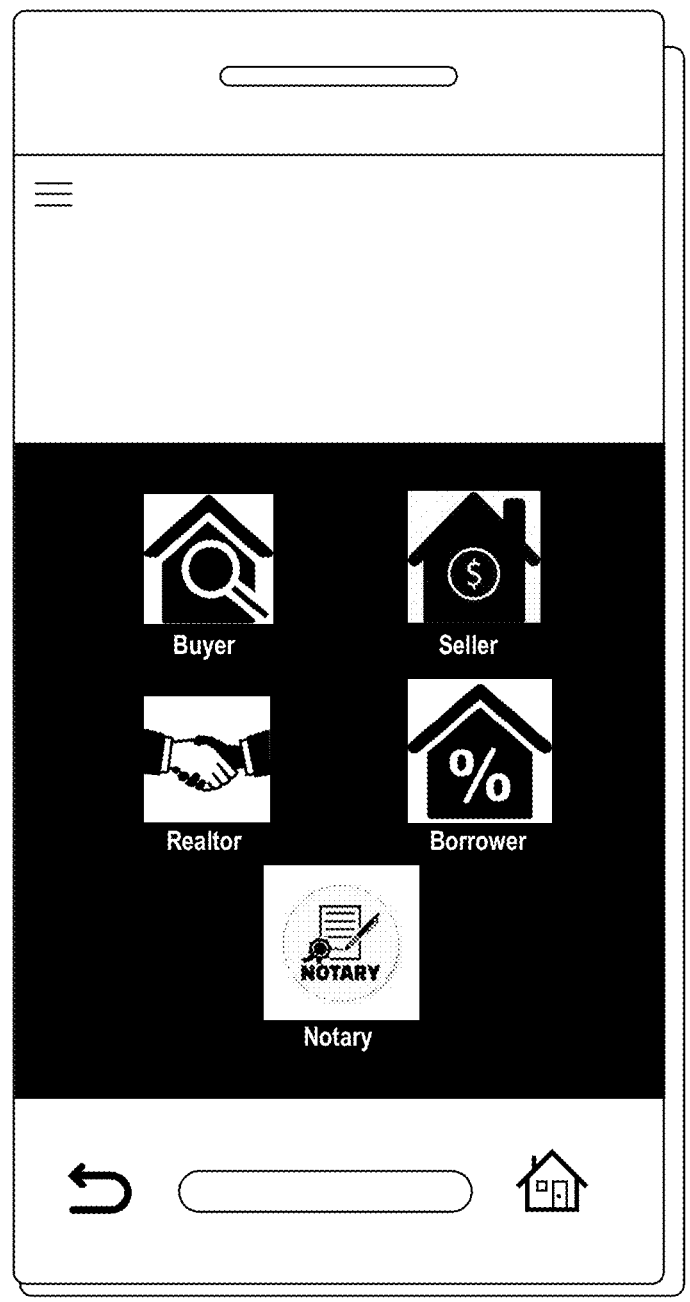

Each participant must download the application 302, register and establish the relevant credentials to be used for authentication. This process can be illustrated with the aid of the screen shots of FIGS. 6a-f. In FIG. 6A, it can be seen that once the application 302 is downloaded onto a device 110, the UI 200 can present a registration page. Once the participant selects the registration process then, as illustrated in FIG. 6B they can then select what type of participant they want to register as. Once the participant makes a selection, the application 302 can attempt to use location services included in device 110 to, e.g., aid authentication.

Figure 6C:
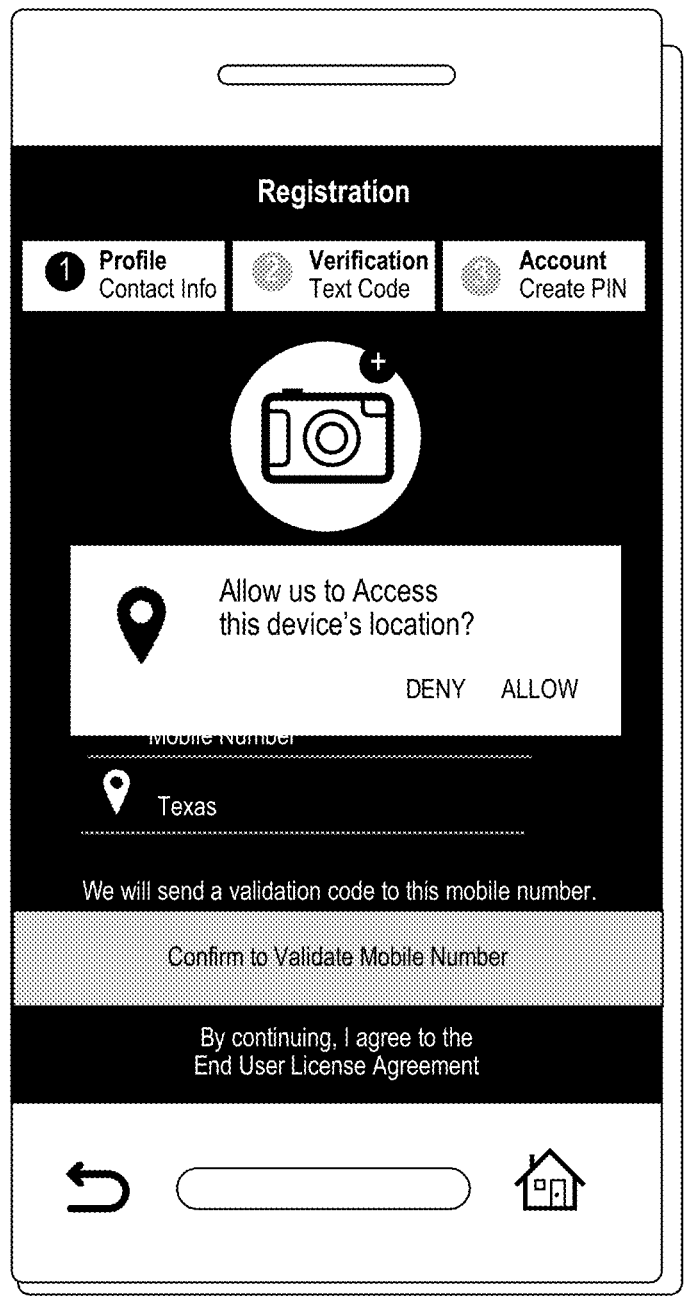

As illustrated in FIG. 6C, the participant can then be prompted through UI 200 to provide identifying and contact information, and be prompted to validate the participant's device 110. The application prompts the users to provide identifying, authenticating information such as first name, last name, e-mail address, mobile telephone number, (for agents and brokers) real estate license number and the state that is the licensing authority and driver license number. Users such as the Buyer Agent, Buyer Broker, Seller Agent and Seller Broker may also be prompted to provide their respective bank account identifying information.

Figure 6D:
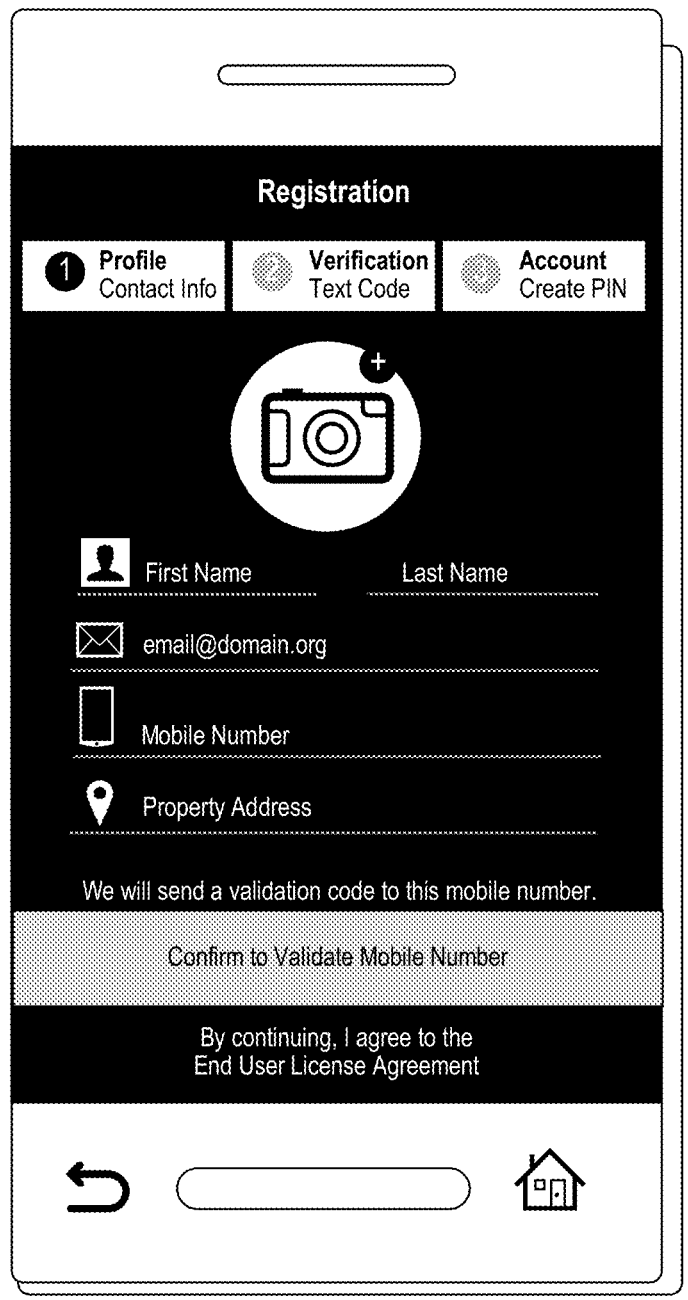

Once the select to confirm the device 110, a code can sent to the mobile device 110, which the user can then enter for validation as illustrated in the screen shot of FIG. 6D.

Figure 6E:
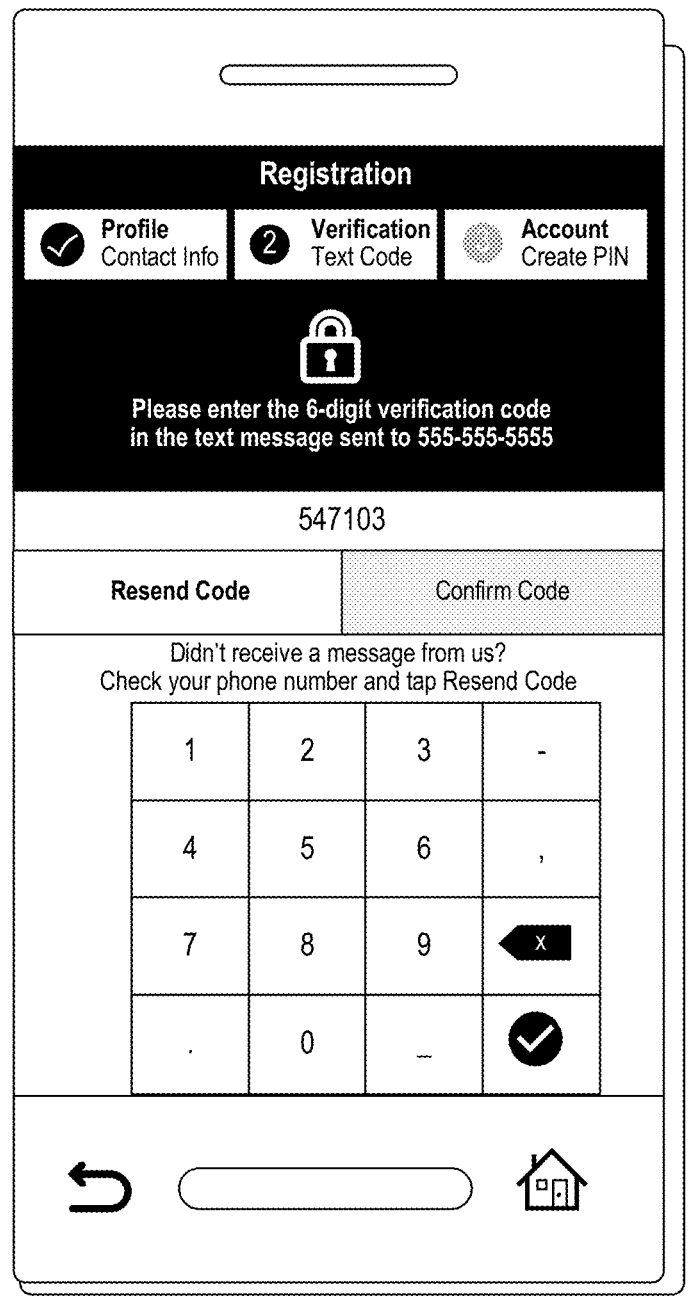

As illustrated in the screen shot of FIG. 6E, the participant can at this point be prompted to generate a credential, which can be as simple as a PIN. In certain other embodiments, however the credential can comprise the capturing of one or more biometric through device 110, as well as other information such as an image of a driver's license, or other identification.

Figure 6F:
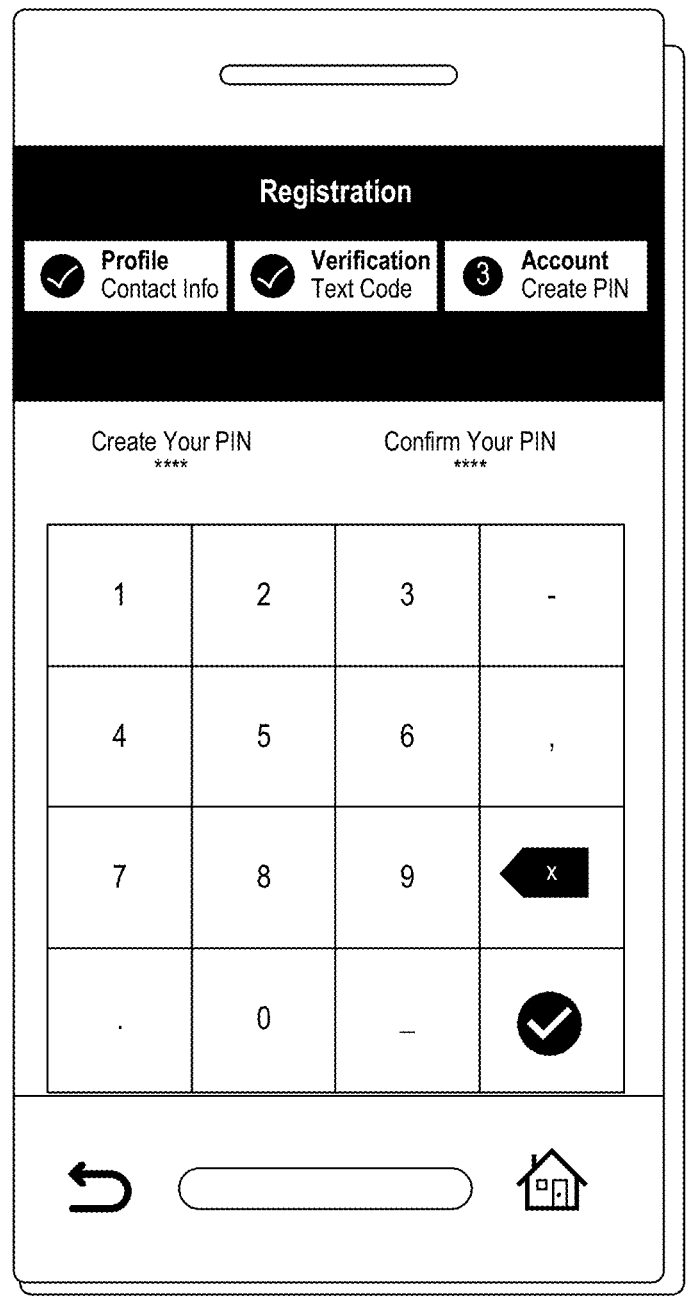

Once registration is complete, the UI 200 can present a home screen from which the participant can access various functions as illustrated in the screen shot of FIG. 6F. The process flow presented to the participant for each function presented will vary depending on the type of participant. In other embodiments, only the seller's agent downloads application 302 and other participants interact with server 120 via notifications and the portals of FIG. 5. In still other embodiments, certain front-end users' interface with the system via mobile application 302, while certain back-end users use portals.

Subscribing front-end users (Buyer, Buyer Agent, Buyer Broker, Seller, Seller Agent (also known as Listing Agent), Seller Broker) can set up secure user accounts to access features and functionalities of the disclosed application as described above. The back-end users of the disclosed application include the Title Company (and specified branches), Title Company Representative(s), Title Company Processing Software, Title Company Escrow Agent, Title Company Bank, Buyer's Lender (if financing is involved), Underwriter, Third Party Vendors/Service Providers (see below) and Sales Agent of Developer (when Seller in the relevant Real Estate Purchase and Sale Contract is a builder/developer). Back-end users can be authenticated and "pre-boarded" during an integration process.

In pre-boarding, the provider/host of the disclosed system inputs identifying information of authorized back-end users of the disclosed system, e.g., via admin portal 512. Pre-boarding also includes inputting identifying information relating to third party vendors involved in the real estate purchase and sale transaction and can also include inputting so-called velocity controls for disbursements to the third-party vendors in which maximum allowed disbursement amounts are specified for each such third-party vendor entity receiving a disbursement (payment), e.g., at/post closing.

The term third party vendor is herein construed broadly and refers to service providers and taxing authorities involved in real estate sales transactions and includes but is not limited to inspectors, handymen, fumigators, law firms/legal representatives of the parties to the transaction, the title company, tax assessor entities, underwriters and Homeowner's Warranty Insurance providers. An approval process can be required for a third-party vendor that has not been pre-boarded.

Pre-boarding is required if the Third-Party Vendor is to be paid via the disbursement's functionality of the disclosed application. In strict liability states underwriters handle escrow thus taking away from independent title companies. Thus, per the disclosed system, underwriters may be pre-boarded thus preserving a role for the independent title company representative.

To open an order, or initiate the handling of a sales transaction, within system 100, the seller's agent can select documents from the home page illustrated in FIG. 6F. The seller's agent can then be prompted per UI 200 to scan and upload the executed Real Estate Purchase and Sale Contract thus causing the capture of certain metadata in that Contract and the efficient, automatic opening of an order in the Title Company Processing Software.

Title Company Processing Software refers to known software applications used by title companies and their representatives and escrow agents to 'open an order,' initiating a process for effecting a closing of a real estate purchase and sale transaction and then processing the order (including calculating Cash Due at Closing and generating a Closing Disclosure document). This step helps to enhance efficiencies in handling of closings by Title Company Representatives and/or Title Company Escrow Agents.

The contract can be captured using device 110 and application 302 or it can be scanned separately and uploaded/downloaded to device 110 or server 120 where it can be accessed via application 302.

Figure 7:
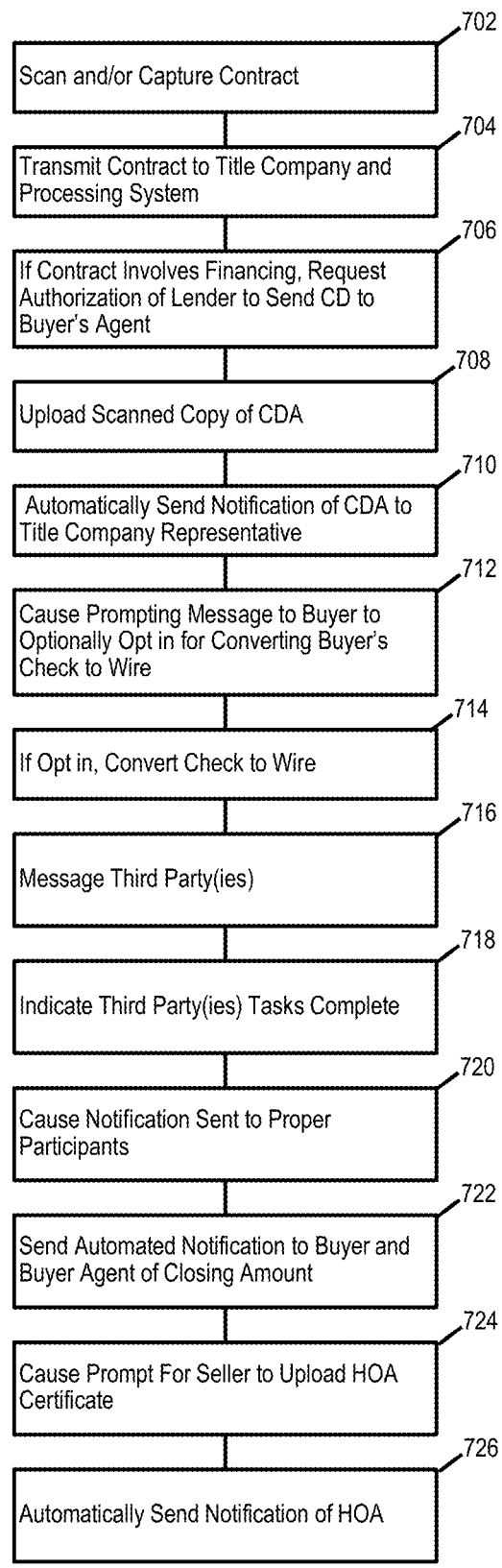
FIG. 7 is a flow chart illustrating a process for entering a contract within the system of FIG. 1.

FIG. 7 is a flow chart illustrating a process for entering a contract using system 100. As noted above, in step 702, the contract can be scan and captured. Certain meta data can be captured at the same time. For example, the instructions can cause the server 120 to recognize certain fields in the contract and capture the information included therein. The captured metadata preferably include the names of the parties to the contract, namely the Buyer and the Seller, sales price, the address for the real property, the amount of the escrow payment, and indication whether or not the buyer seeks financing.

Computer-executable instructions on the Application Server 120 can then cause the transmittal of the Real Estate Purchase and Sale Contract to a pre-boarded Title Company and the Title Company Processing System in step 704. Similarly, when the Seller in a Real Estate Purchase and Sale Transaction is a Developer, the Real Estate Sales Contract between the Buyer and the Developer can be communicated to the Title Processing System and the relevant metadata are automatically captured.

If the Real Estate Purchase and Sale Contract involves financing (as evidenced by captured metadata relating to the financing term/clause in the Contract), then the Application Server can, in step 706 prompt the Buyer to optionally opt into authorizing the Lender to send a copy of the Closing Disclosure (CD) to the Buyer's Agent. This is a useful automated notification feature of the disclosed system as it enables the Buyer Agent to actively follow progress of the financing process to ensure that closing can take place as planned and that the Buyer provides the Lender all of the required information as required per the CD under the newly promulgated rules of the Consumer Financial Protection Board. The opt in by the Buyer protects both the Buyer and the Buyer Agent and ensures protection of the Buyer's personal identifiable information found in the CD.

The Application Server 120 comprises computer-executable instructions for prompting the Seller Agent, Seller Broker, and if applicable Buyer Agent or Buyer Broker, to upload a scanned copy of each page of the Commission Disbursement Agreement (CDA), in step 708 and once uploaded, the Application Server can be configured to automatically e-mail the CDA to the Title Company Representative for use by the Title Company Representative in preparation of the Closing Statement and Closing Documents in step 710.

Per step 712, the Application Server further comprises computer-executable instructions that cause a prompting message to the Buyer to optionally opt in for converting the Buyer's physical check representing Buyer's Cash Due at Closing to a wire. If the Buyer opts in, then at step 714 the Application Server performs the Convert Check to Wire functionality after the Buyer captures an image of the front and back of the check and uploads the image to the Application Server.

It is worth noting that by using the system to perform the wiring function, the process of emailing instructions in the open can be avoided.

As noted above, certain third parties can also be pre-boarded in order to facilitate completion of the transaction. For example, the appraiser and home inspector can be pre-boarded. When their services are needed, application 302 or server 120 can be configured to message the third party(ies) in step 716. Once their tasks are complete, such parties can indicate such through the application 302 or a portal on server 120 in step 718. Such a third party may be required to upload confirmation or documentation that they have completed their task.

For example, the inspector can scan and upload the inspection report, and appraiser can upload the appraisal. This can cause the proper notifications to the proper participants in step 720.

If any repairs need to be made, then a repairman can be notified and once the repairs are made the repairman can upload receipts for material, etc. Alternatively, the seller can upload receipts to confirm that he has ensured the repairs.

As noted, the system can be configured such that payment is made to these third parties once they have confirmed completion of their task. This can involve sending a notification to the participant, such as the buyer or seller or their agent(s) notifying them that payment is due. Payment can then be handled as described above for, e.g., the option payment. Alternatively, payment can be handled at closing as described below.

In step 722, on a date that is before the date of closing set as per the Real Estate Contract (or date of closing as modified and approved by the Parties to the transaction and the Title Company Escrow Agent), the Application Server can be configured to send an automated e-mail notification to the Buyer and the Buyer Agent of the Cash Due At Closing amount.

For certain transactions, such as transactions involving sale of condominium units, there is a provision for transmittal of Homeowners' Association Resale Certificate, which contains important, relevant information sought by the buyer. Typically, the Homeowners' Association assessed a fee to create the HOA Resale Certificate signaling approval of a change in ownership of a unit. Thus, the Application Server 120 can be configured to prompt the Seller or Seller Agent to upload the Homeowners' Association Resale Certificate (if applicable in the transaction), in step 724 and once uploaded, the Application Server can be configured to automatically send an e-mail notification to the Buyer, Buyer Agent, Seller, the Seller Agent and the Title Company Representative in step 726.

Figure 8:
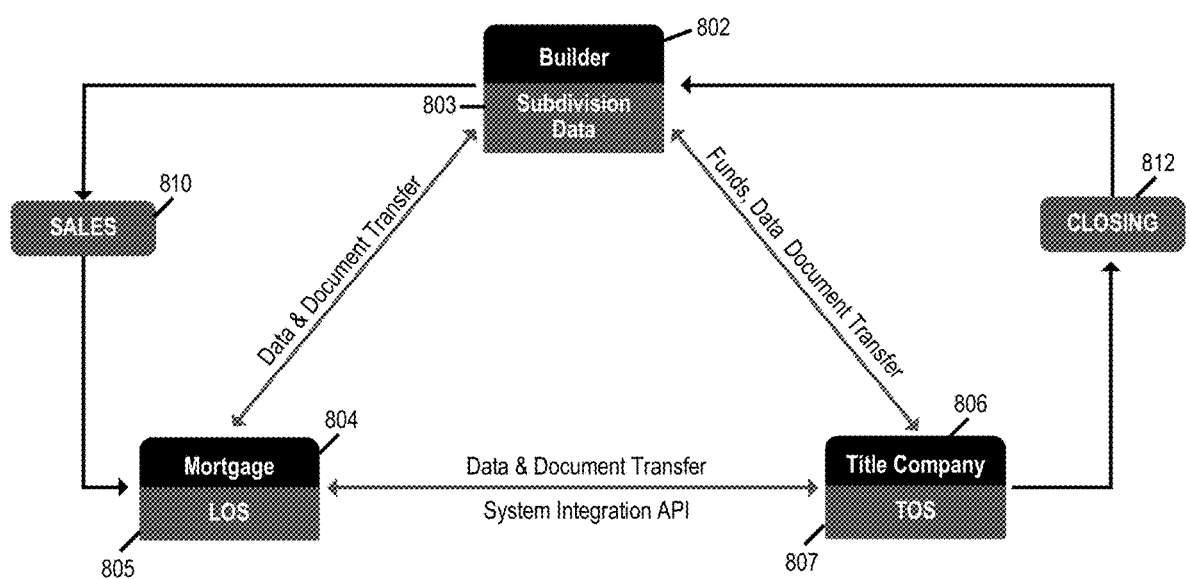
FIG. 8 is a diagram illustrating the transfer of information and funds in a large-scale sales environment within the system of FIG. 1.

As noted above, the seller can be a developer or builder. Thus, the "seller" will be involved in tens or even hundreds of transactions. The systems and methods described herein can clearly make managing such large volumes of transactions much easier. Stated another way, system 100 provides the scalability to handle large volumes of transactions. This is illustrated in FIG. 8, which is a diagram illustrating the transfer of information and funds in a large-scale sales environment.

As can be seen, the builder 802 will have the builders back end systems 803 that handles all of the data for the various properties. This back-end system 803 can communicate with the mortgage companies, or companies' 804 Lender Operating System(s) (LOS) 805 and the Title Company's 806 Title Operating System (TOS) 807, which can also be in communication with each other all through or assisted by the application 302 and server 120 as well as API's therewith.

Thus, as builder 802 engages in sales process 810 with multiple buyers, system 100 can be facilitating those transaction as described above. The property information and associated documentation can be communicated to mortgage company or lender 804 as can buyer information for buyers involved in sales processes 810. Data and documentation for the various transactions can be communicated from the lender 804 to the title company 806. As needed, data and documentation can also be transferred between title company 806 and lender 802 as can the collection of and distribution of any funds, such as earnest money or funds to cover, e.g., the appraisal as described above.

System 100 can also be used to handle the closing process 812, which can proceed as described above for the various properties and transactions.

As noted in FIG. 8, the Title Company can handle the closing process 812. Thus, if the Title Company has opted into a service called the Post-Closing Payments Disbursement System Functionality, at the time of closing, the Application Server 120 can be configured to cause the computer-implemented execution of disbursement of payments due to all disbursees (including but not limited to the Seller (that is if the Seller has opted into receiving funds via the disclosed Closing Payments Disbursement functionality of the Application Server), Seller Agent, Seller Broker, Buyer Agent, Buyer Broker, Title Company, legal representative(s), taxing authority/authorities) per the Closing Statement. The Closing Statement, prepared by the Title Company Representative or Title Company Escrow Agent via TOS 807, itemizes all of the amounts due to each disbursee and identifies each disbursee.

Payment options in real estate transactions include ACH or wire. Laws bar the use of ACH payments to escrow accounts and so payments to escrow accounts are typically made by wire and not ACH. In a conventional process for disbursements of checks at or post-closing, a title company representative (typically the Escrow Agent) creates physical checks due to each of the myriad parties, ensures the checks are signed and the checks are then mailed. Errors may be introduced at each step. System 100 provides a more efficient and secure process with the added benefit of converting the checks to wire. Additionally, conventional processes for effecting disbursements of checks after a closing has the potential to introduce human error (incorrect amount, incorrect disburse, lack of authorized signor(s)), fraud (wrong amount, incorrect disbursee, lack of authorized signors) and/or delay in processing (generating, mailing) the checks.

The disclosed Closing Payments Disbursement Module functionality 812 addresses each of these concerns by automating the creation of the disbursement checks, reducing the amount of dormant money, and by incorporating controls such as the requirement for two signors and the verification of the amounts of the checks against pre-set so-called 'velocity controls' for limits on the amounts payable to each specified disbursee. An added advantage is that the disbursement checks generated via the Application Server are ACH. The Application Server generates ('prints') electronic checks for each disbursee and in amounts as specified per the Closing Statement. In creating the electronic checks, no less than two (2) electronic signatures are required to be affixed to the electronic checks. After the electronic signatures are applied, the checks are converted to ACH and this is lawful as the check creation occurs outside of the escrow account. The electronic checks are then automatically deposited using the third-party payment processing service provider and the Application Server 120 causes the sending of automated e-mail notifications confirming the disbursements.

Controls in the Closing Payments Disbursement System include the following: 1) Electronic signatures of two authorized individuals e-signing the checks are required and 2) pre-set velocity control verification step is applied for each check at the time that the electronic disbursements are generated. If an amount shown on the Closing Statement for any disburse does not meet the pre-set velocity controls for that disbursee, the Application Server 120 will not create the disbursement order and the Application Server 120 will not generate that disbursement check and the Application Server 120 sends an e-mail notification. This step protects against human error and fraud that may occur in the disbursement process after closing.

In certain embodiments, there is included a mobile-enabled application 302 that connects subscribing users that are licensed real estate agents and their brokers based on the content they post via the application 302 via their user devices. So, for example, an agent may post content (free-form text, photos, zip code, etc.) describing attributes of a real property sought by his/her client, such as for example zip code(s). Based on the desired zip code(s) for that real property, the application pushes (sends) the content to application users that are licensed real estate agents and brokers in the zip code(s) and/or agents and brokers who 'farm' the specified zip code(s) and/or have listings in the zip code(s). Today, agents and brokers utilize e-mail, face-to-face meetings and known social media platforms such as Facebook to communicate with their contacts ('friends') regarding real estate-related business. This capability offers a more efficient, secure alternative for agents and brokers to communicate real estate-related business with automatically targeted communications while preserving a professional image that is separate from the agents and brokers' non-business-related postings on social media.

Figure 9:
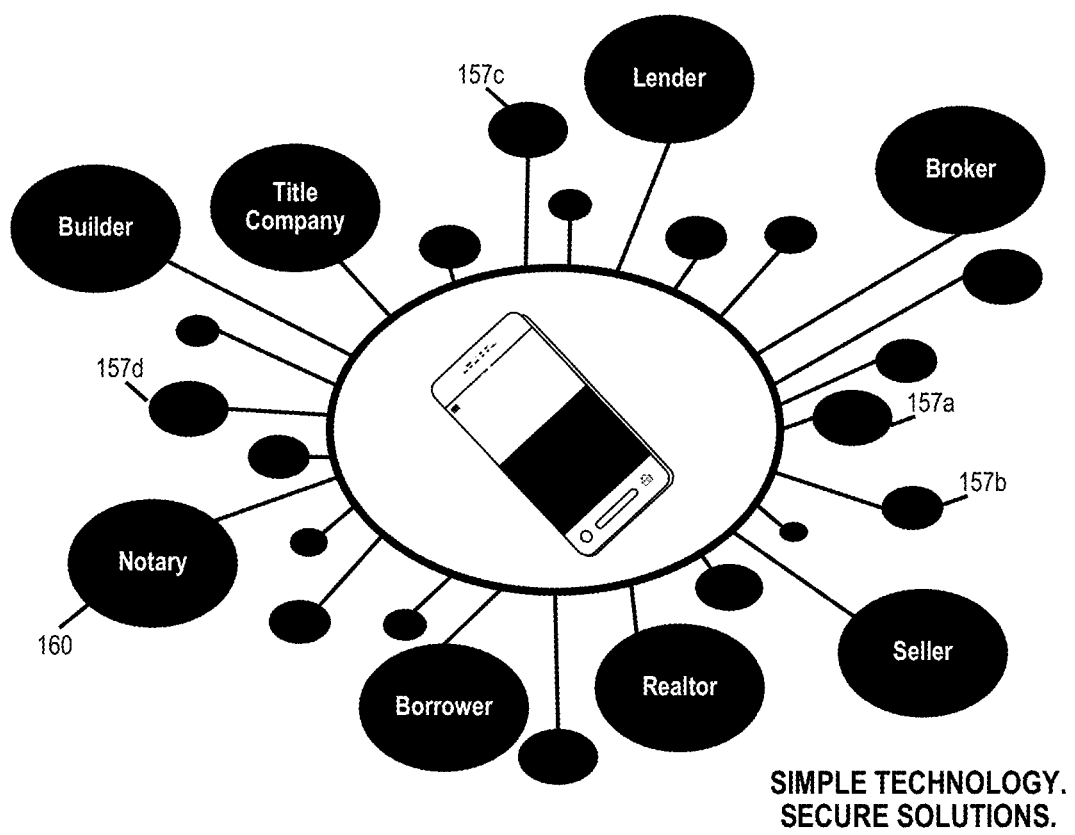
FIG. 9 is a diagram illustrating the interfacing of multiple third parties via the application of FIGS. 6a-f within the system of FIG. 1.

Thus, as illustrated in FIG. 9, multiple third parties 157 can also be interfaced with system 100 via an application 302. These third parties can provide services, documentation, engage in "chat" communications, etc. Some of these third parties may provide or receive funds either during the transaction or at closing as described above.

System 100 can greatly increase the efficiency of dealing with such third parties and can increase the efficiency with which such parties are paid and provide better records of the services provided by such third parties and any reports provided thereby.

Figure 10:
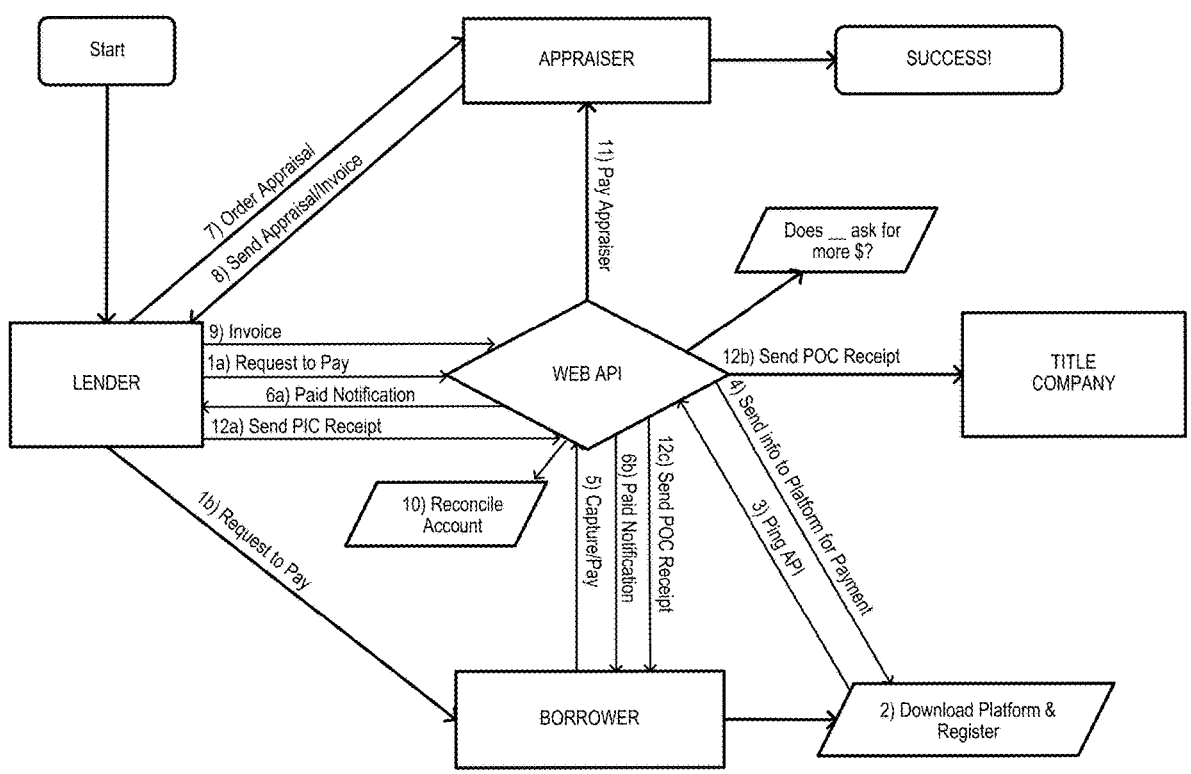
FIG. 10 is a diagram illustrating an example process for ordering an appraisal and paying the appraiser within the system of FIG. 1.

The potential complexity of these processes, but the efficiency provided by system 100 is illustrated with respect to the diagram of FIG. 10, which illustrates the process for ordering an appraisal and paying the appraiser using system 100. First, lender 804 requests, via the LOS 805 that the borrower or buyer pay for the appraisal (1b in FIG. 10). The lender 804 also notifies server 120 that the buyer was notified to pay (1b).

If not done already, buyer can then download application 302 from a platform 1002 such as Google Play or iTunes and can register with server 120 as described above (2). The platform 1002 can ping server 120 (3) and server 120 can send information related to payment in response (4).

Buyer can then capture an image of a check and can forward to server 120 95). Server 120 can then confirm to the lender that payment was received (6a) and confirm receipt to the buyer (6b). The Lender's LOS 805 can then order the appraisal from Appraiser 157 (7) and once the appraiser has completed the appraisal, then he or she can cause the appraisal and the invoice to be sent to the LOS 805 (8).

LOS 805 can then send the invoice to server 120 (9) and server 120 can reconcile the invoice to the amount paid and request more funds if needed (10). Once the appropriate funds are received, then server 120 can pay appraiser 157 via dedicated FTP to their financial institution 170 (11). Server 120 can then send a notification of a Paid Outside of Closing (POC) transaction to all parties including the title company 806 (12).

Thus, multiple parties and third parties can use system 120 to access various services. As illustrated in FIG. 5, a party or user can sign (and register if needed) to the platform hosted by server 120 via an application 302, e.g., downloaded form a platform 1002. Once signed in, this will take the user to their landing page, which can give them access to the various resources 518-518-530, e.g., via portals 504-512.

FIG. 11 is another way to look at the resources provided by the platform hosted on server 120. FIG. 11 is a cross matrix of the various user types and the services provided.

The Authentication piece can be very powerful. As noted above, when a user registers they can be required to create a credential for authentication purposes. In certain embodiments, this can comprise a simple PIN. Bu tin others, the credential can also comprise biometrics and other factors. Moreover, a user can be required to capture an image of their identification, such as a driver's license or passport. Moreover, geolocation can be used to verify identification or to verify that a service being provided, such as an inspection, is actually being performed at the correct location.

Not only can this increase the level of authentication and prevent fraud, some of this information can also be stored for verification purposes.

In certain embodiments, a Notary can be used for, e.g., a remote closing. In such a process, a Notary can be dispatched to the location of the Buyer. Using the application, the Notary can authenticate the user as described above, e.g., by capturing driver's license information, etc. The location of the Notary can then be verified using the geolocation capability of device 110. Video capabilities of device 110 can then be used to capture the signing of the documents. In certain embodiments, the actual signed documents can be loaded to server 120 through the application. The closing funds can then be captured as described above.

One option for capturing the closing funds, or any other funds that has not yet been described is to allow the, e.g., Seller to use their Debit Card. As noted above, various types of monies are required to be put into escrow during transactions such as real-estate transactions. While ACH is a convenient way to transfer funds, ACH will not generally work for, e.g., real-estate deals, because the payor can reverse the transaction for up to 90 days. But most, e.g., real-estate closings occur within 40 days. Thus, as noted above for, e.g., real-estate transactions, cashier's checks, paper checks, and wired funds are used; however, paper checks are being used less and less and the process for wiring funds or getting a cashier's check are inconvenient and inefficient. Platform 100 enables the user to capture the debit card information in order to generate an electronic check that can be electronically signed by the account holder and then sent to the escrow account for processing.

In other words, the user provides the debit card information. Server 120 contacts the appropriate financial institution 170 to verify funds and provide the transaction details so that the funds can be transferred from the user's account to, e.g., escrow. Once the funds are verified and the transfer completed, the financial institution server 120 can generate a check image that meets the requirements of, e.g., Check 21 that can actually be processed and saved.

In certain embodiments, the systems and methods described herein may store transaction data and facilitate a transfer of funds. For example, as described previously in connection to FIG. 1, the systems may be interfaced on the back-end with various institution systems associated with various participants involved with transactions. Similar to the payments described in embodiments illustrated in the figures throughout this application, such systems may be also be used to make and verify payments through wire transfer instructions. Thus, for example with reference to FIG. 1, server 120 may be interfaced with a financial institution(s) 195 associated with various users. In certain embodiments, depending on what payment options are available, server 120 can also interface with payment service providers 160 associated with the various payment options and/or institutions to provide, for example, payment instructions. Alternatively, server 120 can act as the payment processor.

Wire transfer instructions require interfacing between various financial institutions via the mobile application and sever. Thus, in some embodiments, the application 302 or application server 120 can cause a transfer of funds for a payment from a user account 197 to the escrow account 172 of the escrow/title company 170. The instructions can include: an escrow/title company identifier (e.g., a name, address, etc.); an identifier of the financial institution associated with account of the escrow/title company (e.g., a name, address, routing number, etc.); an identifier or information associated with the account of the an escrow/title company (e.g., an account number, etc.); a payment amount; an identifier of the user or payee seeking to transfer funds (e.g., a name, email address, cell phone number, driver's license information); a geographical location of the mobile device having the mobile application thereon; a payment date and/or time; a captured image of the driver's license of the payee, a property address associated with the transaction; and/or any combination including one or more thereof.

Figures 12A, 12B:
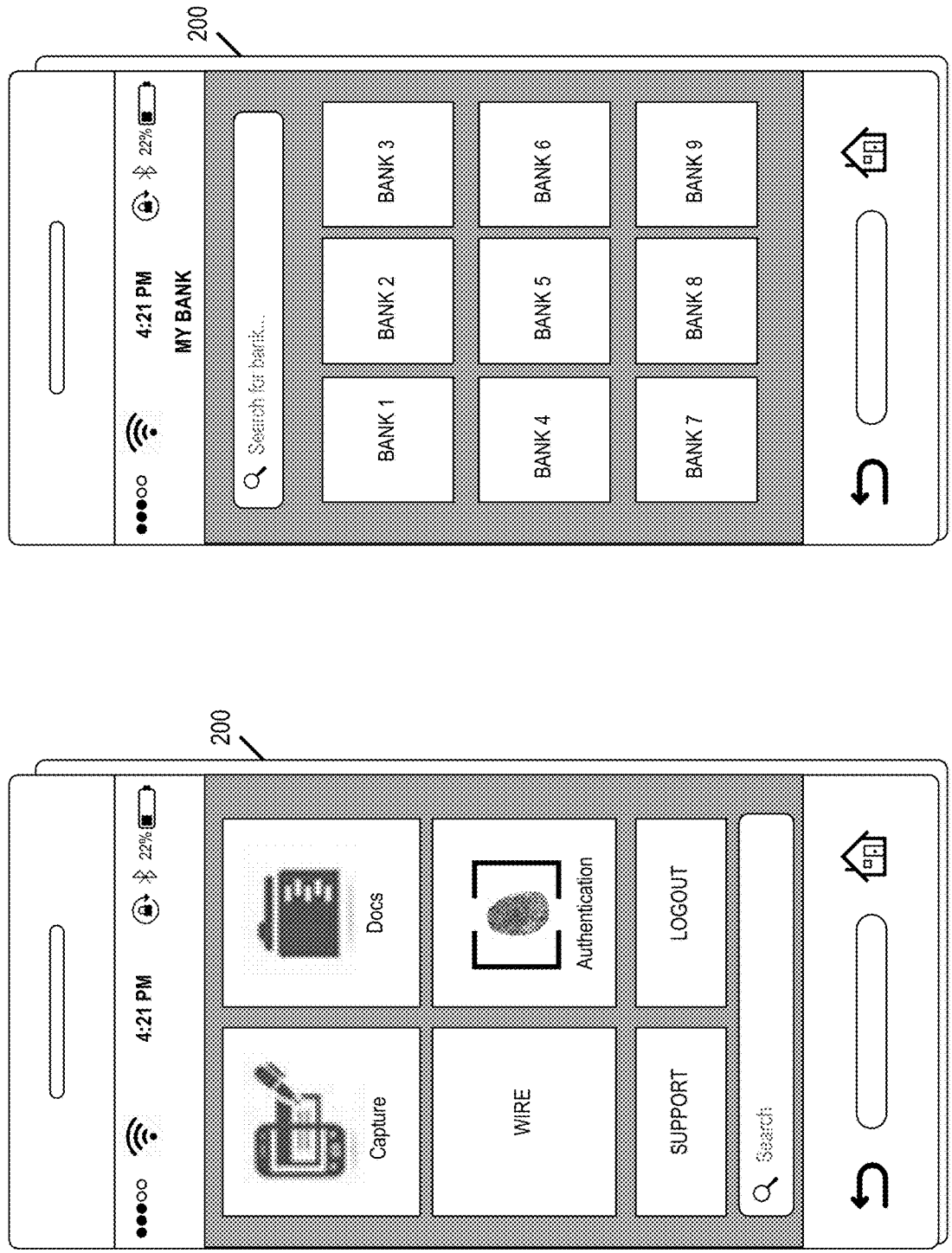
FIGS. 12a-e are screen shots illustrating an example process for storing, providing, and facilitating a payment using the system of FIG. 1.

For example, a process for facilitating a wire transfer is illustrated with the aid of the screen shots of FIGS. 12*a-e*. As described above, a user can select a payment in the application user interface 200. The user can then select the form of payment, such as, "WIRE" through the UI 200 of the mobile application 302, as illustrated in FIG. 12*a*. FIG. 12*a* also illustrates an example UI including authentication, document management, and alternate payment forms, including a capture of an image that may be used, for example, in earnest money or option fee payments as described above. As illustrated in FIG. 12*b*, the user can then select a financial institution from which funds may be retrieved for payment associated with the transaction, via UI 200. For example, the application can be pre-boarded with one or more financial institutions 195 that maintain one or more accounts 197 if the user. In connection to FIGS. 12*a-e*, a "user" may refer to any user of the mobile device and/or mobile application. Thus, in some embodiments, the user may refer to a buyer of property, a buyer's agent, a lender who is lending funds to the buyer for facilitating the transaction, a seller, or any other third party.

Figure 12E:
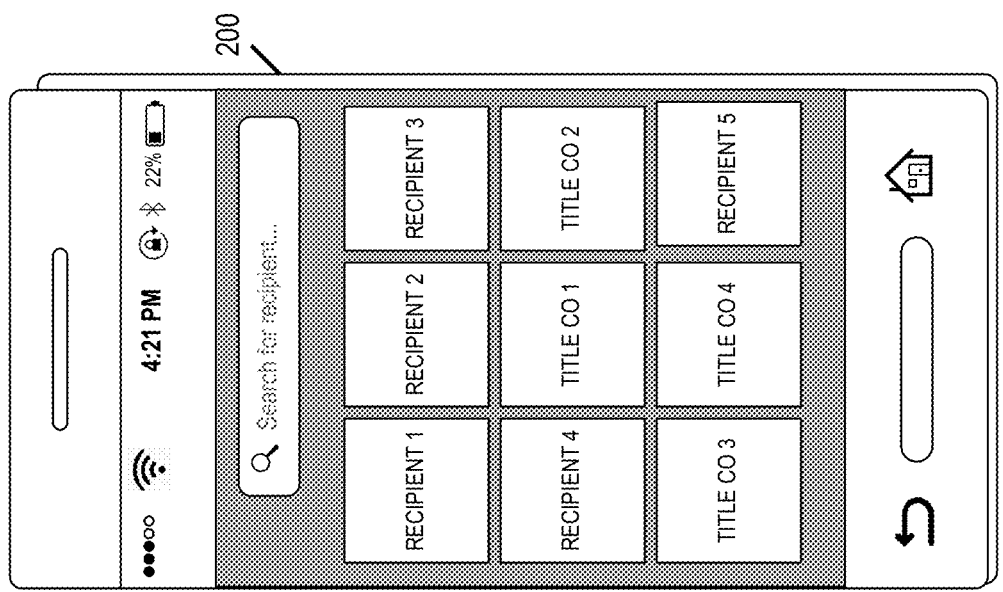
Figure 12D:
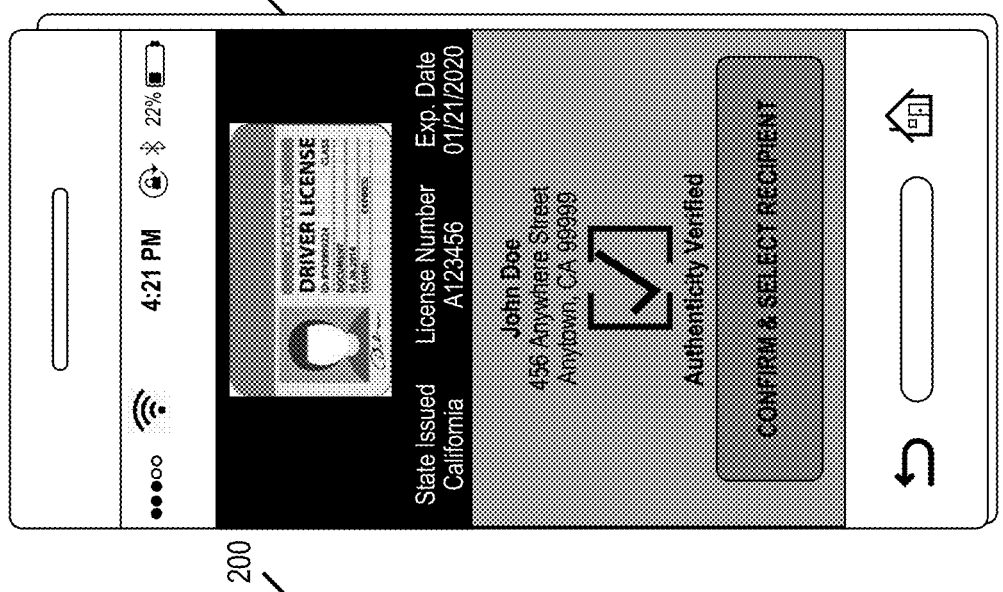
Figure 12C:
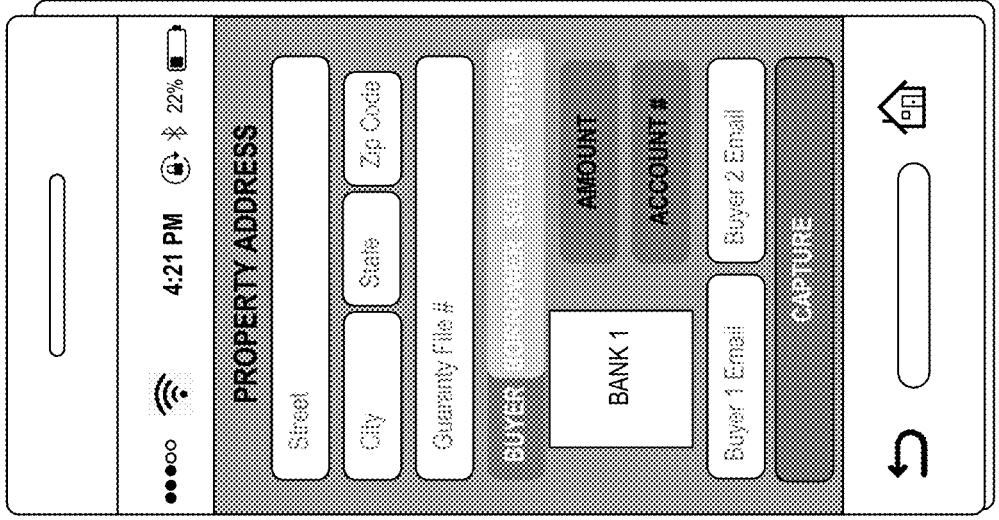

In certain embodiments, the user can then be presented with a screen via UI 200 that allows the agent to upload the transaction data, including payment amount and an account identifier of the user account maintained by the financial institution selected in FIG. 12*b*, as illustrated in FIG. 12*c*. In some embodiments, the user may also upload a transaction identifier for associating the payment with the transaction. The transaction identifier may include, but is not limited to, the property address and/or name or other identifier of the property associated with the transaction. The information illustrated in FIG. 12*c* may be entered by the user via the UI 200 or otherwise uploaded by capturing the information as described above (e.g., extracted from a captured image of a check, contract, closing document, or other document related to a transaction).

In some embodiments, as can be seen in FIG. 12*c*, in response to receiving the account information and/or transaction identifier, the mobile application 302 can then prompt the user to capture one or more images of the user's identification to verify the identity associated with the account. FIG. 12*d* illustrates capturing a form of identification, a driver's license in this example. The UI 200 may then process the image to extract relevant identification data, such as the state that issued the driver's license, the license number, and the expiration data, among other data, as shown in FIG. 12*d*. It should be noted that other identification forms may be used, for example, a passport, identification card, etc. and relevant data extracted therefrom.

It should also be noted that this capture can also be performed by someone other than the user, for example, a buyer's agent, user's agent, notary, etc. Thus, in some embodiments, while the user and/or device operated thereby may be authenticated via the authentication option shown in FIG. 12*a* (e.g., as described above), the identity of owner of the account for payment may be different and require additional identity verification. Thus, the user's identity may be verified via the mobile application for third party access to the account associated with the user.

Once the identification data is extracted from the identification document, the user may verify that the data is correct via a display and confirm such via the UI 200 as illustrated in FIG. 12*d*. In certain embodiments, at the same time or in a separate selection, the user may be prompted to select a recipient as shown in FIG. 12*d*. As illustrated in FIG. 12*e*, the user can be presented with a plurality of recipients and can then select the recipient to receive payment via the UI 200. Additionally, or alternatively, the user may be able to search a database of recipients. While, FIG. 12*e* illustrates a plurality of title companies, it will be appreciated that the recipient may be any user of the system. For example, sellers, buyer's agent, seller's agent, escrow company, third party providers, etc. may be recipients. In some embodiments, recipients may be stored and/or pre-boarded onto server 120, and have an account connected thereto that is maintained by a financial institution.

In certain embodiments, following identification of the recipient in FIG. 12*e*, the application 302 may transmit transaction data to the server 120. The transaction data may be indicative of some or all of the information that the user has for defining a transfer of funds for payment as described in FIGS. 12a-12e. For example, the transaction data may include an identifier of the recipient (e.g., as selected in FIG. 12e), an amount of funds for payment, and an identifier of the user. Additionally, the transaction data may include, but not to be limited to, the identifier of the recipient (e.g., name and/or address); the identifier of the user (e.g., name, address, contact information including email address and/or cell phone number); a geographic location of the device running application 302; the payment data and/or time; the identification data, an image of the identification document, the transaction identifier (e.g., the property address), or any combination thereof.

In response to receiving the transaction data, the server 120 (or application 302 in some embodiments), may be configured to generate transfer instructions data comprising transfer instructions. The transfer instruction data may include at least a portion of the transaction data and an identifier of a financial institution that maintains an account associated with the recipient. For example, the server 120 (or application 302) may receive transaction data comprising an identifier of the recipient, and compare the identifier to a database of recipients to retrieve an account of the recipient maintained by a financial institution or retrieve the financial institution.

Additionally, are alternatively, the transfer instruction data may include: an escrow/title company identifier (e.g., a name, address, etc.); an identifier of the financial institution associated with account of the escrow/title company (e.g., a name, address, routing number, etc.); an identifier or information associated with the account of the an escrow/title company (e.g., an account number, etc.); a payment amount; an identifier of the user or payee seeking to transfer funds (e.g., a name, email address, cell phone number, driver's license information); a geographical location of the mobile device having the mobile application thereon; a payment date and/or time; a captured image of the driver's license of the payee, a property address associated with the transaction; and/or any combination including one or more thereof. The instructions may be provided so to cause the receiving financial institution to set up a wire transfer of the funds indicated from the user's account to the recipient account.

The server 120 may then forward the transfer instructions data to the financial institution of the user (e.g., as identified in the transaction and/or transfer instructions data) to cause the financial institution of the user to execute a transfer. For example, the transfer may be a wire transfer that causes a deposit of the funds from the user's account into the recipient account in accordance with the transfer instructions data. Thus, in some embodiment, by selecting the target recipient, the server may retrieve information of an associated account and/or financial institution, and may provide the financial institution of the user (e.g., the financial institution selected in FIG. 12b) with instructions for transferring funds associated with the payment to the financial institution of the recipient account. In some embodiments either or both of the server 120 and application 302 may be configured to provide the instructions.

Thus, the server 120 and/or mobile application 302 on a user's device can generate transfer instructions and provide such instructions to the financial institution 195 of the user. This may cause a transfer of funds be provided to, for example, the financial institution 170 associated with the escrow/title company 180 for deposit into the appropriate escrow account 172 from account 197 of the user. The financial institution 195 may use the image of the identification document of the transfer instruction data and/or the identification data extracted therefrom, to verify the identity of the user and/or grant access to the funds in the account of the user based on a comparison of the identity of the owner of the account against identification data. Where if the identity of the owner matches the identification data, the wire transfer may be executed. As noted above, a payment processor 160 can facilitate the transaction. In other embodiments, the recipient account need not be associated with the escrow/title company, but may be an account associated with any user of the system.

In some embodiments, the transaction or transfer instructions data may be utilized to confirm that the amount of funds indicated in the payment amount is actually available in the account associated with the user. For example, wire transferring of funds provides a real-time method of immediately transferring funds between the user account and the recipient account. Thus, the proper amount of funds must be available and able to be transferred upon receipt of the instructions at the financial institution 195 and verification of the identity of the user and owner of the account.

The user can then receive a confirmation similar to the confirmation illustrated in FIG. 2i and an indication that all parties will be notified in a manner similar to that illustrated in FIG. 2j. The notifications 304 can automatically be sent to all or selected transaction participants.

Thus, the application 302 or application server 120 can cause a notification to be sent to the user associated with the escrow account recipient account. The notification can include: an identifier (e.g., a name) of the user who initiated the transaction; the user's contact information; a transaction identifier (e.g., a property address associated with the transaction); a payment amount; an identifier of the recipient; an identifier of the other parties involved in the transaction; the date and time of the delivery of the payment; an indication of successful or unsuccessful transfer, and any combination of one or more thereof.

In addition, or alternatively, the notification may include a link that can be used to access one or more portions of the transaction data stored at the application 302/server 120. The receipt notification can be printed and placed in a physical file. Alternatively, a virtual file can be maintained on server 120 and accessed through application 302 or via a portal to server 120.

Figure 13:
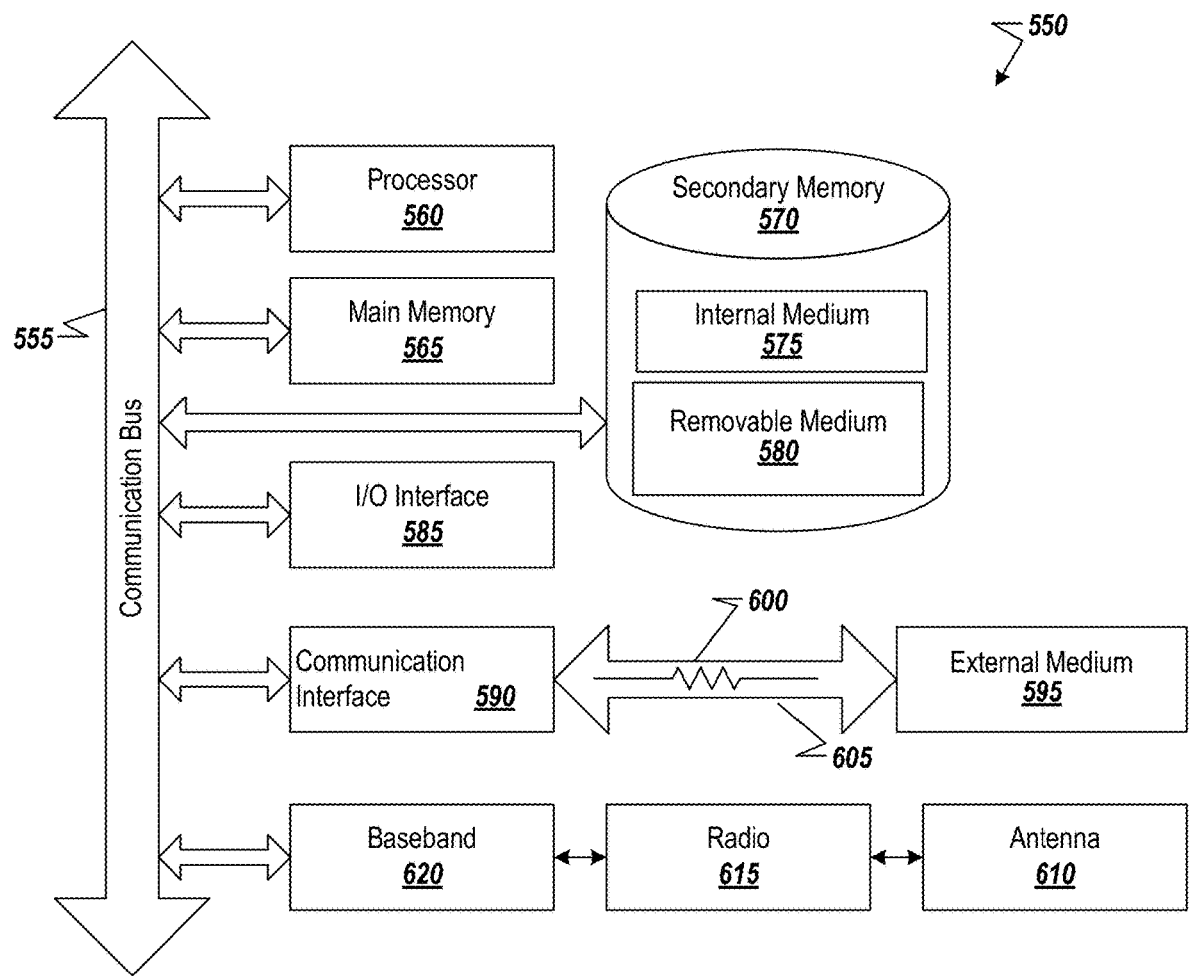
FIG. 13 is a block diagram illustrating an example wired or wireless system that can be used within the system of FIG. 1.

FIG. 13 is a block diagram illustrating an example wired or wireless system 550 that may be used in connection with various embodiments described herein. For example, the system 550 may be used as or in conjunction with the system 100, as previously described with respect to FIGS. 1-11. The system 550 can be a conventional personal computer, computer server, personal digital assistant, smart phone, tablet computer, or any other processor enabled device that is capable of wired or wireless data communication. More particularly, the system 550 may represent the application server. Other computer systems and/or architectures may be also used, as will be clear to those skilled in the art.

The system 550 preferably includes one or more processors, such as processor 560. Additional processors may be provided, such as an auxiliary processor to manage input/output, an auxiliary processor to perform floating point mathematical operations, a special-purpose microprocessor having an architecture suitable for fast execution of signal processing algorithms (e.g., digital signal processor), a slave processor subordinate to the main processing system (e.g., back-end processor), an additional microprocessor or controller for dual or multiple processor systems, or a coprocessor. Such auxiliary processors may be discrete processors or may be integrated with the processor 560.

In one embodiment, the application server can be configured with more than one processor in order to separately process the incoming signals from a plurality of sensing devices, while a yet further processor is responsible for handling communication with the gateway device. In another embodiment, the gateway device may also be configured with a plurality of processors, with one processor configured to receive and process data from the central control device, a second processor configured to generate graphical user interfaces to display the received data to the user on a display of the gateway device and a third processor to communicate with the remote server. For a portable electronic device such as the central control device and gateway device, the processors may be low power processors to reduce power consumption on the devices' batteries.

The processor 560 is preferably connected to a communication bus 555. The communication bus 555 may include a data channel for facilitating information transfer between storage and other peripheral components of the system 550. The communication bus 555 further may provide a set of signals used for communication with the processor 560, including a data bus, address bus, and control bus (not shown). The communication bus 555 may comprise any standard or non-standard bus architecture such as, for example, bus architectures compliant with industry standard architecture ("ISA"), extended industry standard architecture ("EISA"), Micro Channel Architecture ("MCA"), peripheral component interconnect ("PCI") local bus, or standards promulgated by the Institute of Electrical and Electronics Engineers ("IEEE") including IEEE 488 general-purpose interface bus ("GPM"), IEEE 696/S-100, and the like. These standards may be applicable to the remote server, while additional or varying standards may apply to portable electronic devices such as the central control device or sensing devices.

System 550 preferably includes a main memory 565 and may also include a secondary memory 570. The main memory 565 provides storage of instructions and data for programs executing on the processor 560. The main memory 565 is typically semiconductor-based memory such as dynamic random-access memory ("DRAM") and/or static random-access memory ("SRAM"). Other semiconductor-based memory types include, for example, synchronous dynamic random-access memory ("SDRAM"), Rambus dynamic random-access memory ("RDRAM"), ferroelectric random-access memory ("FRAM"), and the like, including read only memory ("ROM").

The secondary memory 570 may optionally include an internal memory 575 and/or a removable medium 580, for example a floppy disk drive, a magnetic tape drive, a compact disc ("CD") drive, a digital versatile disc ("DVD") drive, etc. The removable medium 580 is read from and/or written to in a well-known manner. Removable storage medium 580 may be, for example, a floppy disk, magnetic tape, CD, DVD, SD card, etc.

The removable storage medium 580 is a non-transitory computer readable medium having stored thereon computer executable code (i.e., software) and/or data. The computer software or data stored on the removable storage medium 580 is read into the system 550 for execution by the processor 560.

In alternative embodiments, secondary memory 570 may include other similar means for allowing computer programs or other data or instructions to be loaded into the system 550. Such means may include, for example, an external storage medium 595 and an interface 590. Examples of external storage medium 595 may include an external hard disk drive or an external optical drive, or and external magneto-optical drive.

Other examples of secondary memory 570 may include semiconductor-based memory such as programmable read-only memory ("PROM"), erasable programmable read-only memory ("EPROM"), electrically erasable read-only memory ("EEPROM"), or flash memory (block-oriented memory similar to EEPROM). Also included are any other removable storage media 580 and communication interface 590, which allow software and data to be transferred from an external medium 595 to the system 550.

System 550 may also include an input/output ("I/O") interface 585. The I/O interface 585 facilitates input from and output to external devices. For example, the I/O interface 585 may receive input from a keyboard or mouse and may provide output to a display. The I/O interface 585 is capable of facilitating input from and output to various alternative types of human interface and machine interface devices alike.

System 550 may also include a communication interface 590. The communication interface 590 allows software and data to be transferred between system 550 and external devices (e.g. printers), networks, or information sources. For example, computer software or executable code may be transferred to system 550 from a network server via communication interface 590. Examples of communication interface 590 include a modem, a network interface card ("NIC"), a wireless data card, a communications port, a PCMCIA slot and card, an infrared interface, and an IEEE 1394 fire-wire, just to name a few.

Communication interface 590 preferably implements industry promulgated protocol standards, such as Ethernet IEEE 802 standards, Fiber Channel, digital subscriber line ("DSL"), asynchronous digital subscriber line ("ADSL"), frame relay, asynchronous transfer mode ("ATM"), integrated digital services network ("ISDN"), personal communications services ("PCS"), transmission control protocol/Internet protocol ("TCP/IP"), serial line Internet protocol/point to point protocol ("SLIP/PPP"), and so on, but may also implement customized or non-standard interface protocols as well.

Software and data transferred via communication interface 590 are generally in the form of electrical communication signals 605. These signals 605 are preferably provided to communication interface 590 via a communication channel 600. In one embodiment, the communication channel 600 may be a wired or wireless network, or any variety of other communication links. Communication channel 600 carries signals 605 and can be implemented using a variety of wired or wireless communication means including wire or cable, fiber optics, conventional phone line, cellular phone link, wireless data communication link, radio frequency ("RF") link, or infrared link, just to name a few.

Computer executable code (i.e., computer programs or software) is stored in the main memory 565 and/or the secondary memory 570. Computer programs can also be received via communication interface 590 and stored in the main memory 565 and/or the secondary memory 570. Such computer programs, when executed, enable the system 550 to perform the various functions of the present invention as previously described.

In this description, the term "computer readable medium" is used to refer to any non-transitory computer readable storage media used to provide computer executable code (e.g., software and computer programs) to the system 550. Examples of these media include main memory 565, secondary memory 570 (including internal memory 575, removable medium 580, and external storage medium 595), and any peripheral device communicatively coupled with communication interface 590 (including a network information server or other network device). These non-transitory computer readable mediums are means for providing executable code, programming instructions, and software to the system 550.

In an embodiment that is implemented using software, the software may be stored on a computer readable medium and loaded into the system 550 by way of removable medium 580, I/O interface 585, or communication interface 590. In such an embodiment, the software is loaded into the system 550 in the form of electrical communication signals 605. The software, when executed by the processor 560, preferably causes the processor 560 to perform the inventive features and functions previously described herein.

The system 550 also includes optional wireless communication components that facilitate wireless communication over a voice and over a data network. The wireless communication components comprise an antenna system 610, a radio system 615 and a baseband system 620. In the system 550, radio frequency ("RF") signals are transmitted and received over the air by the antenna system 610 under the management of the radio system 615.

In one embodiment, the antenna system 610 may comprise one or more antennae and one or more multiplexors (not shown) that perform a switching function to provide the antenna system 610 with transmit and receive signal paths. In the receive path, received RF signals can be coupled from a multiplexor to a low noise amplifier (not shown) that amplifies the received RF signal and sends the amplified signal to the radio system 615.

In alternative embodiments, the radio system 615 may comprise one or more radios that are configured to communicate over various frequencies. In one embodiment, the radio system 615 may combine a demodulator (not shown) and modulator (not shown) in one integrated circuit ("IC"). The demodulator and modulator can also be separate components. In the incoming path, the demodulator strips away the RF carrier signal leaving a baseband receive audio signal, which is sent from the radio system 615 to the baseband system 620.

If the received signal contains audio information, then baseband system 620 decodes the signal and converts it to an analog signal. Then the signal is amplified and sent to a speaker. The baseband system 620 also receives analog audio signals from a microphone. These analog audio signals are converted to digital signals and encoded by the baseband system 620. The baseband system 620 also codes the digital signals for transmission and generates a baseband transmit audio signal that is routed to the modulator portion of the radio system 615. The modulator mixes the baseband transmit audio signal with an RF carrier signal generating an RF transmit signal that is routed to the antenna system and may pass through a power amplifier (not shown). The power amplifier amplifies the RF transmit signal and routes it to the antenna system 610 where the signal is switched to the antenna port for transmission.

The baseband system 620 is also communicatively coupled with the processor 560. The central processing unit 560 has access to data storage areas 565 and 570. The central processing unit 560 is preferably configured to execute instructions (i.e., computer programs or software) that can be stored in the memory 565 or the secondary memory 570. Computer programs can also be received from the baseband processor 610 and stored in the data storage area 565 or in secondary memory 570, or executed upon receipt. Such computer programs, when executed, enable the system 550 to perform the various functions of the present invention as previously described. For example, data storage areas 565 may include various software modules (not shown) that are executable by processor 560.

Various embodiments may also be implemented primarily in hardware using, for example, components such as application specific integrated circuits ("ASICs"), or field programmable gate arrays ("FPGAs"). Implementation of a hardware state machine capable of performing the functions described herein will also be apparent to those skilled in the relevant art. Various embodiments may also be implemented using a combination of both hardware and software.

Furthermore, those of skill in the art will appreciate that the various illustrative logical blocks, modules, circuits, and method steps described in connection with the above described figures and the embodiments disclosed herein can often be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled persons can implement the described functionality in varying ways for each particular application, but such implementation decisions should not be interpreted as causing a departure from the scope of the invention. In addition, the grouping of functions within a module, block, circuit or step is for ease of description. Specific functions or steps can be moved from one module, block or circuit to another without departing from the invention.

Moreover, the various illustrative logical blocks, modules, and methods described in connection with the embodiments disclosed herein can be implemented or performed with a general purpose processor, a digital signal processor ("DSP"), an ASIC, FPGA or other programmable logic device, discrete gate or transistor logic, discrete hardware components, or any combination thereof designed to perform the functions described herein. A general-purpose processor can be a microprocessor, but in the alternative, the processor can be any processor, controller, microcontroller, or state machine. A processor can also be implemented as a combination of computing devices, for example, a combination of a DSP and a microprocessor, a plurality of microprocessors, one or more microprocessors in conjunction with a DSP core, or any other such configuration.

While certain embodiments have been described above, it will be understood that the embodiments described are by way of example only. Accordingly, the systems and methods described herein should not be limited based on the described embodiments. Rather, the systems and methods described herein should only be limited in light of the claims that follow when taken in conjunction with the above description and accompanying drawings.

What is claimed:

1. A system for storing and accessing data for a real estate transaction, and for facilitating exchange of the data related thereto, the system comprising:
    a database; and
    an application server coupled with the database and configured to store information associated with a plurality of real estate transactions between a first party and a second party, wherein the information for each real estate transaction includes a transaction identifier and identifiers of one or more third parties related to the real estate transaction, the one or more third parties registered with the application server using corresponding identifiers, the application server further configured to:

receive document data from a device of a third party of the one or more third parties, wherein the document data is representative of one or more documents related to the real estate transaction and comprises an identifier of the third party, a transaction identifier and one or more images of the one or more documents, the third party being distinct from the first party and the second party of the real estate transaction, in response to receiving the document data from the device of the third party, generate and send one or more notifications to at least one of the first party, the second party, and the third party associated with the real estate transaction based on the transaction identifier, wherein the one or more notifications are indicative of an action to be performed by at least one of the first or second parties to complete the real estate transaction comprising issuing a check drawn on an account of the at least one of the first and second parties, and wherein a device associated with the at least one of the first and second parties is configured to:

capture images of the check, execute image processing on the images of the check to verify the captured images conform with one or more image quality requirements, and in response to successful verification, extract at least a part of transaction data for a payment in connection to the real estate transaction from the images of the check, and transmit the extracted transaction data to the application server, based on receiving the extracted transaction data, forward the extracted transaction data to a financial institution of the third party to cause a deposit into an account of the third party based on the identifier provided in the document data, generate a data file, store the data file on the database, and generate a notification of the data file, wherein the data file is representative of the extracted transaction data, automatically, in response to forwarding the extracted transaction data to the financial institution, transmit the notification of the data file to the third party based on the identifier of the third party, and generate and transmit another notification to the at least one of the first and second parties or an agent of the at least one of the first or second parties in response to depositing the payment into the account of the third party.

2. The system of claim 1, wherein the application server is further configured to transmit a message to the device of the third party, the message comprising an indication of a task to be completed by the third party related to the real estate transaction.

3. The system of claim 2, wherein the application server is further configured to receive confirmation from the device of the third party that the task has been completed, wherein document data comprises the confirmation.

4. The system of claim 1, wherein the third party comprise one or more of an agent of the first party, an agent of the second party, an escrow agent, an appraiser, and an inspector, a repairman, a financial institution maintaining an account related to one of the first and second parties related to the real estate transaction, or any combination thereof.

5. The system of claim 1, wherein the device comprises an application running thereon, and wherein the application causes the device to:

capture the one or more images of the one or more documents related to the real estate transaction;

process the one or more images of the one or more documents related to the real estate transaction;

extract data representative of the one or more documents; and forward the extracted data representative of the one or more documents to the application server.

6. The system of claim 5, wherein the notification comprises electronically generated images based on the processed one or more images.

7. The system of claim 5, wherein the notification comprises a link to the extracted data representative of the one or more documents stored on the application server.

8. The system of claim 5, wherein the application is further configured to;

send the one or more images of the check to a check image server;

receive a processed check image back from the check image server; and provide the processed check image to the application server.

9. The system of claim 8, wherein the application server receives the processed check image from the check image server instead from the device.

10. The system of claim 8, wherein processing the check image creates a legally compliant check image.

11. The system of claim 5, wherein the application server is further configured to:

execute image processing on the one or more images of the one or more documents to verify that the captured one or more images of the one or more documents conform with the one or more image quality requirements, and wherein extracting the data representative of the one or more documents is in response to the verification that the captured one or more images of the one or more documents conform with the one or more image quality requirements.

12. The system of claim 1, wherein the device of the third party comprises an application running thereon, and wherein the device receives an electronically scanned copy of the one or more documents related to the real estate transaction, and the application further causes the device to:

process the scanned copy to generate the document data representative of the one or more documents; and upload the document data to the application server.

13. The system of claim 1, wherein one of the one or more documents is an agreement between one or more of parties related to the real estate transaction, wherein the application server is configured to generate and send the notification of the data file and the another notification based on information in the agreement.

14. The system of claim 1, wherein the application server includes portals for parties related to the real estate transaction that allows the parties to access the application server and manage accounts related thereto.

15. The system of claim 1, wherein the application server further comprises a database management resource for managing the database, a payment processing resource for managing payment transactions, and an authentication resource for managing authentication of users of the application server.

16. The system of claim 1, wherein the application server is further configured to:
receive an authentication credential associated with the one or more documents; and authenticate a party related to the real estate transaction before storing the data representative of the one or more documents.

\* \* \* \* \*